(12) United States Patent
Nishizawa et al.

(10) Patent No.: US 7,627,492 B2
(45) Date of Patent: Dec. 1, 2009

(54) CONTENT DISTRIBUTION SYSTEM, CONTENT RESERVATION MANAGEMENT APPARATUS, CONTENT RESERVATION MANAGEMENT METHOD, CONTENT RESERVATION MANAGEMENT PROGRAM, AND CONTENT RESERVATION MANAGEMENT PROGRAM STORAGE MEDIUM

(75) Inventors: Shigehiko Nishizawa, Kanagawa (JP); Katsushi Fujii, Chiba (JP)

(73) Assignee: Sony Corporation, Tokyo (JP)

( * ) Notice: Subject to any disclaimer, the term of this patent is extended or adjusted under 35 U.S.C. 154(b) by 895 days.

(21) Appl. No.: 10/201,160

(22) Filed: Jul. 24, 2002

(65) Prior Publication Data

US 2003/0033384 A1    Feb. 13, 2003

(30) Foreign Application Priority Data

Jul. 25, 2001    (JP)    ............................. P2001-225055

(51) Int. Cl.
*G06Q 10/00*    (2006.01)
(52) U.S. Cl. ............................... 705/5; 725/46; 725/40; 725/47
(58) Field of Classification Search .................... 705/1, 705/14, 80; 725/8, 114
See application file for complete search history.

(56) References Cited

U.S. PATENT DOCUMENTS

| 4,815,030 | A | * | 3/1989 | Cross et al. .................... 707/10 |
| 5,768,528 | A | * | 6/1998 | Stumm ........................ 709/231 |
| 6,052,715 | A | * | 4/2000 | Fukui et al. .................. 725/114 |
| 6,370,571 | B1 | * | 4/2002 | Medin, Jr. .................... 709/218 |
| 6,774,926 | B1 | * | 8/2004 | Ellis et al. ................. 348/14.01 |
| 6,981,214 | B1 | * | 12/2005 | Miller et al. ................. 715/517 |
| 7,103,905 | B2 | * | 9/2006 | Novak .......................... 725/46 |

FOREIGN PATENT DOCUMENTS

WO    WO 00/57333    *    9/2000

OTHER PUBLICATIONS

"Acron and Optivision Enable a New Generation of Intranet Applications Using High Quality Video", PRNewswire, Apr. 7 1999.*

* cited by examiner

*Primary Examiner*—John W Hayes
*Assistant Examiner*—Rob Wu
(74) *Attorney, Agent, or Firm*—Oblon, Spivak, McClelland, Maier & Neustadt, L.L.P.

(57) ABSTRACT

In content distribution, even if a reservation for a distribution channel and a distribution time slot is not performed before a predetermined time is reached, in response to a real-time distribution reservation request from a user PC, a predetermined time period including a current time at which the request is received is reserved in a channel which is unoccupied at the current time. A reservation setting information file concerning the reservation is also transmitted to the user PC, and reservation data is sent to a server-use reservation management center. Thus, the content received from the user PC is immediately distributed to clients via a streaming server according to the reservation setting information file.

16 Claims, 34 Drawing Sheets

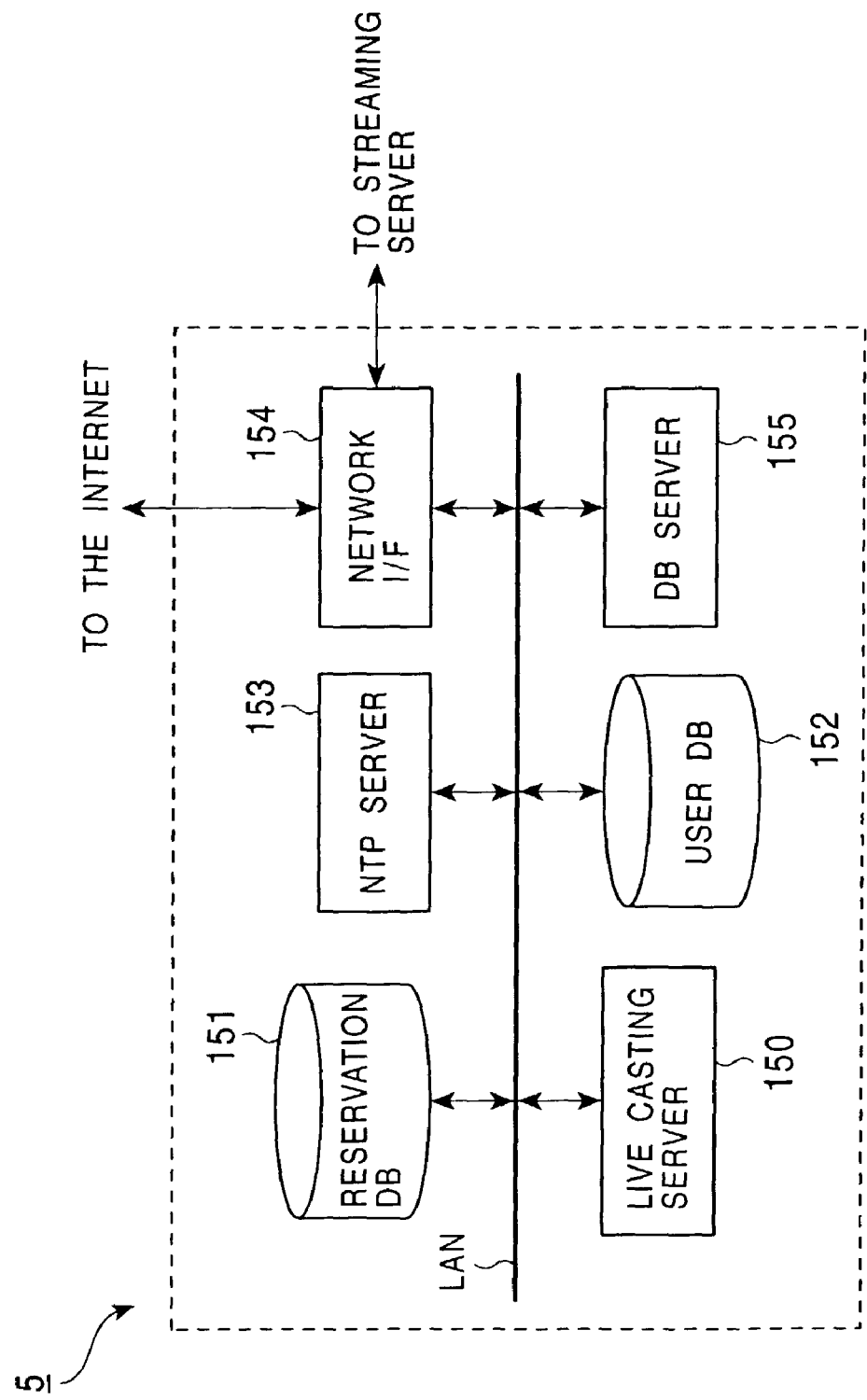

Membership Registration Input Screen

210

| Input Item | Input Column |
|---|---|
| Name (Kanji) | △○ 太郎 |
| (Roman Characters) | ○○ TAROU |
| User ID | ○○○○ |
| Password | ××××  |
| e-mail Address | △△△@○○.com |
| Disclose e-mail Address? | YES |

If you want premium membership registration, check the check box to input the following input items.

Premium Membership Registration ☑   211

| Input Item | Input Column |
|---|---|
| Address | ○○市○○区○○3-5-5 |
| Telephone No. | 03-1234-5670 |
| Credit Card No. | 1234-5678-9102 |
| Credit Card Expiration Date | May 2003 |
| Cell Phone No. | 090-1000-2000 |
| Fax No. | 03-1234-5671 |

Cancel  Register
212     213

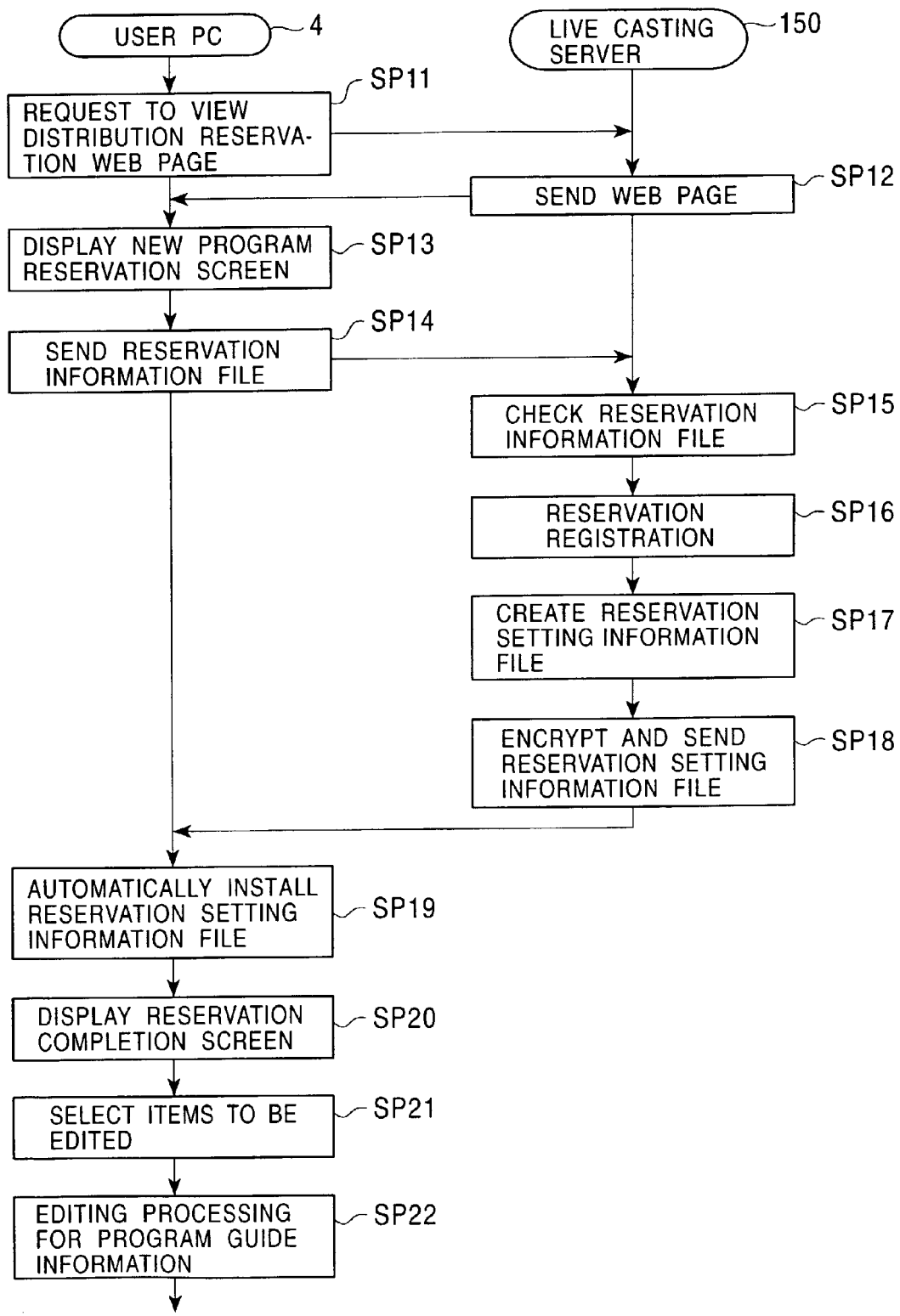

| New Program Reservation | | | | | | MY STUDIO  TO TOP PAGE |
|---|---|---|---|---|---|---|
| 1 Usage Regulations | ▶ 2 Input Title | ▶ 3 Set Distribution Time and Date | ▶ 4 Input Card Information | ▶ 5 Card Authentication | ▶ 6 Connection Settings | ▶ 7 Complete |

Please select the day from the calendars and check the reservation status of the selected day. Then, input the time and date and the channel according to the number of streams to be distributed.

▽ Click the day to check the reservation status.

| March | | | | | | |
|---|---|---|---|---|---|---|
| Sun. | Mon. | Tues | Wen. | Thrs | Fri. | Sat. |
|  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 | 31 |

You have 100 minutes left this month.

| April | | | | | | |
|---|---|---|---|---|---|---|
| Sun. | Mon. | Tues | Wen. | Thrs | Fri. | Sat. |
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 |  |  |  |  |  |

You have 100 minutes left this month.

| May | | | | | | |
|---|---|---|---|---|---|---|
| Sun. | Mon. | Tues | Wen. | Thrs | Fri. | Sat. |
|  |  |  | 1 | 2 | 3 | 4 | 5 |
| 6 | 7 | 8 | 9 | 10 | 11 | 12 |
| 13 | 14 | 15 | 16 | 17 | 18 | 19 |
| 20 | 21 | 22 | 23 | 24 | 25 | 26 |
| 27 | 28 | 29 | 30 | 31 |  |  |

You have 100 minutes left this month.

165A — Distribution Day  : Month [ - ▽]  Day [ - ▽]
165B — Start Time  : Hour [ - ▽] Minute [ - ▽]
165C — Distribution Time  : Minute [ - ▽]  You have 300 minutes left.
165D — Distribution Channel : [ - ▽]

※ You won't be charged if you cancel the reservation three hours before the distribution time. However, after this, you will be charged for the full fee for the reserved program.

( Return )  ( Set )
   165F      165E

1 Usage Regulations ▶ 2 Input Title ▶ 3 Set Distribution Time and Date ▶ 4 Input Card Information ▶ 5 Card Authentication ▶ 6 Connection Settings ▶ 7 Complete New Program Reservation　　　　　　　　MY STUDIO　　TO TOP PAGE Title: CONGRATULATION

| Reserved Day | Reserved Time | Channel | Time | Fee |
|---|---|---|---|---|
| 03/30 | 12:00 –12:10 | 123ch(10) | 10min. | ¥31,500 |

166A

166B

| | (Yen) |
|---|---|
| Program fee | 31,500 |
| Pickup registration fee | 500 |
| Broadcast discount | 23% |
| Personal discount | -1,200 |
| Sub total | 32,000 |
| Consumption tax | 1,600 |
| Total | 33,600 |

[Please input credit card information]

Card type [Please select. ▽]

Card No. [　　　　　　　]
(Do not use half-size characters or hyphens.)

Expiring date　Month [- ▽]　Year [- ▽]

166C

※ If you press the "set" button, card authentication is started. Once card authentication is started, you cannot return to the previous screen.

※ Use personal discount only once and you cannot save the balance remaining.

※ Fractions of the broadcast discount will be rounded.

( Return )　( Set )

| New Program Reservation | | | | | | | MY STUDIO　　TO TOP PAGE |

1 Usage Regulations ▶ 2 Input Title ▶ 3 Set Distribution Time and Date ▶ 4 Input Card Information ▶ 5 Card Authentication ▶ 6 Connection Settings ▶ 7 Complete Credit card information is now authenticated. Please wait for a moment.

Reservation ID: ○○○○
Distribution Reserved Time and Date:
    2001:03:30:12:00:00 − 2001:03:30:12:10:00
Server Connection Time: 2001:03:30:11:55:00 − 2001:03:30:12:15:00

Connecting Telephone No.
    Carrier 01:03 −1234−5670
    Carrier 02:03 −1234−5671
    Carrier 03:03 −1234−5672
    Carrier 04:03 −1234−5673
Connecting Server Information
    Server Type: RealServer5_
    Server Name: LiveServer.com
    Connection Port: 555
    Server Stream Path: /channell/stream.rm Distribution Request Address Information:
    rtsp//liveserver.com:554/channell/stream.rm
Transmission Band: 20kbps, 34kbps, 45kbps, 80kbps, 220kbps
Title: ××××Live
Summary: ··········
Disclosure Level: ··········
Friend List Address Information
    List 01: ○○ @ ××.com
    List 02: △△ @ ××.co.jp
    List 03: ×× @ ○○.com Distribution Request Password: × × × × ×

| New Program Reservation | | | | | | MY STUDIO   TO TOP PAGE |
|---|---|---|---|---|---|---|
| 1 Usage Regulations | ▶ 2 Input Title | ▶ 3 Set Distribution Time and Date | ▶ 4 Input Card Information | ▶ 5 Card Authentication | ▶ 6 Connection Settings | ▶ 7 Complete |

Title: CONGRATULATION

| Distribution Date | Start Time – End Time | Channel | Viewing Password |
|---|---|---|---|
| 03/03 | 12:00 –12:10 | 123ch(10) | ✶✶✶✶✶✶ |

~168A

Set connecting information for live distribution to the CastaDrive-compatible system.
Please download the system as follows.
Make sure to use the CastaDrive-compatible system for live distrubution.
IE 4.0 or higher is recommended.

[How to Set]
⟨If you use IE 4.0 or higher⟩
Please click the "automatic setting" button. The setting information is automatically registered.

( Automatic Setting )~168B

⟨If you use another browser ⟩
Please click the "reservation file download" button to start downloading the setting information file, and store the file in a suitable location.
Read the stored file with the CastaDrive-compatible file. Then, the setting information is registered.

( Reservation File Download )

| New Program Reservation | | | | | | MY STUDIO  TO TOP PAGE |
|---|---|---|---|---|---|---|
| 1 Usage Regulations | ▶ 2 Input Title | ▶ 3 Set Distribution Time and Date | ▶ 4 Input Card Information | ▶ 5 Card Authentication | ▶ 6 Connection Settings | ▶ 7 Complete |

Reservation is Completed.

Title: CONGRATULATION

| Distribution Date | Start Time – End Time | Channel | Viewing Password |
|---|---|---|---|
| 03/03 | 12:00 –12:10 | 123ch(10) | ****** |

169A

Only the time slot has been reserved. Please click the following "to program guide page editing" button to register the reserved program information. In the "information guide page editing", you can edit the program title, the guide information, etc. and customize the guide page the playback page, etc.. Create and produce your own program!

( Return to My Studio )  ( To Program Guide Page Editing )

169C  169B

CONTENT DISTRIBUTION SYSTEM, CONTENT RESERVATION MANAGEMENT APPARATUS, CONTENT RESERVATION MANAGEMENT METHOD, CONTENT RESERVATION MANAGEMENT PROGRAM, AND CONTENT RESERVATION MANAGEMENT PROGRAM STORAGE MEDIUM

BACKGROUND OF THE INVENTION

1. Field of the Invention

The present invention generally relates to a content distribution system, a content reservation management apparatus, a content reservation management method, a content reservation management program, and a content reservation management program storage medium. The invention can be suitably applied to, for example, a content distribution system for distributing content from a user personal computer (PC) to a client via a predetermined streaming server.

2. Description of the Related Art

Hitherto, in a content distribution system, when, for example, providing content created by a user from a user terminal via the Internet, it is distributed to a client from the user terminal via a streaming server.

In this type of content distribution system, the number of distribution channels for distributing the content by the streaming server is restricted. Accordingly, the user has to reserve the time and date, and the time slot during which the user wishes to use the streaming server. The content is then distributed according to the reserved time and date.

In this system, however, in order to make a reservation for the streaming server, the user terminal must obtain in advance a reservation setting information file for automatically connecting to the streaming server at the distribution start time, and the user has to complete a reservation procedure at least a few hours before the distribution start time. Accordingly, the user cannot distribute the content in real time without making a reservation.

SUMMARY OF THE INVENTION

Accordingly, in view of the above-described problem, it is an object of the present invention to provide a content distribution system, a content reservation management apparatus, a content reservation management method, a content reservation management program, and a content reservation management program storage medium, in which the content can be immediately distributed in real time according to the necessity without making a reservation.

In order to achieve the above object, according to one aspect of the present invention, there is provided a content distribution system including: a user terminal; a content distribution server for distributing content received from the user terminal to a client via a network; and a content reservation management apparatus for receiving a reservation for a distribution channel and a time slot in which the distribution channel is to be used from the user terminal before a predetermined time is reached. The user terminal makes a real-time distribution reservation request to the content reservation management apparatus in order to immediately distribute the content. In response to the real-time distribution reservation request, the content reservation management apparatus reserves a predetermined time period, including a current time at which the request is received, in a channel which is unoccupied at the current time, and sends reservation setting information concerning the reservation to the user terminal and to the content distribution server. The content distribution server immediately distributes the content received from the user terminal according to the reservation setting information.

According to another aspect of the present invention, there is provided a content reservation management apparatus for receiving a reservation for a distribution channel and a time slot in which the distribution channel is to be used from a user terminal before a predetermined time is reached when content received from the user terminal is distributed from a content distribution server to a client via a network, and for managing the received reservation. The content reservation management apparatus includes: a real-time distribution reservation receiving unit for receiving a real-time distribution reservation request from the user terminal in order to immediately distribute the content; and a control unit, for reserving, in response to the real-time distribution reservation request, a predetermined time period, including a current time at which the request is received, in a channel which is unoccupied at the current time, and sending reservation setting information concerning the reservation to the user terminal and to the content distribution server, thereby achieving real-time distribution for immediately distributing the content received from the user terminal to the client in real time via the content distribution server based on the reservation setting information.

According to still another aspect of the present invention, there is provided a content reservation management method for receiving a reservation for a distribution channel and a time slot in which the distribution channel is to be used from a user terminal before a predetermined time is reached when content received from the user terminal is distributed from a content distribution server to a client via a network, and for managing the received reservation. The content reservation management method includes: a real-time distribution reservation receiving step of receiving a real-time distribution reservation request from the user terminal in order to immediately distribute the content; and a control step, of reserving, in response to the real-time distribution reservation request, a predetermined time period, including a current time at which the request is received, in a channel which is unoccupied at the current time, and sending reservation setting information concerning the reservation to the user terminal and to the content distribution server, thereby achieving real-time distribution for immediately distributing the content received from the user terminal to the client in real time via the content distribution server based on the reservation setting information.

According to a further aspect of the present invention, there is provided a content reservation management program for allowing a computer to execute: a real-time distribution reservation receiving step of receiving a real-time distribution reservation request from a user terminal in order to immediately distribute content, when a reservation for a distribution channel and a time slot in which the distribution channel is to be used is received from the user terminal before a predetermined time is reached in distributing the content received from the user terminal from a content distribution server to a client via a network, and when the received reservation is managed; and a control step, of reserving, in response to the real-time distribution reservation request, a predetermined time period, including a current time at which the request is received, in a channel which is unoccupied at the current time, and sending reservation setting information concerning the reservation to the user terminal and to the content distribution server, thereby achieving real-time distribution for immediately distributing the content received from the user terminal to the client in real time via the content distribution server based on the reservation setting information.

The present invention also provides a storage medium for storing the above-described content reservation management program to be executed by an information processing apparatus.

Accordingly, even if a reservation for distributing the content is not made in advance, in response to a real-time distribution reservation request from a user terminal, a predetermined time period, including the current time at which the request is received, can be reserved in a channel which is unoccupied at the current time. Then, reservation setting information concerning the reservation is sent to the user terminal and to the content distribution server. Thus, the content received from the user terminal can be immediately distributed from the content distribution server according to the reservation setting information.

BRIEF DESCRIPTION OF THE DRAWINGS

FIG. 11 is a block diagram illustrating the configuration of a server-use reservation management center;

FIG. 14 illustrates a membership registration input screen;

FIG. 15 is a flowchart illustrating a reservation registering sequence;

FIG. 19 illustrates a broadcast time-and-date setting screen;

FIG. 20 illustrates a settlement screen;

FIG. 21 illustrates a settling screen;

FIG. 22 illustrates the content of a reservation setting information file;

FIG. 23 illustrates an automatic-setting screen for automatically setting the reservation setting information file;

FIG. 24 illustrates a reservation completion screen;

DESCRIPTION OF THE PREFERRED EMBODIMENTS

The present invention is described in detail below with reference to the accompanying drawings through illustration of an embodiment.

Figure 1:
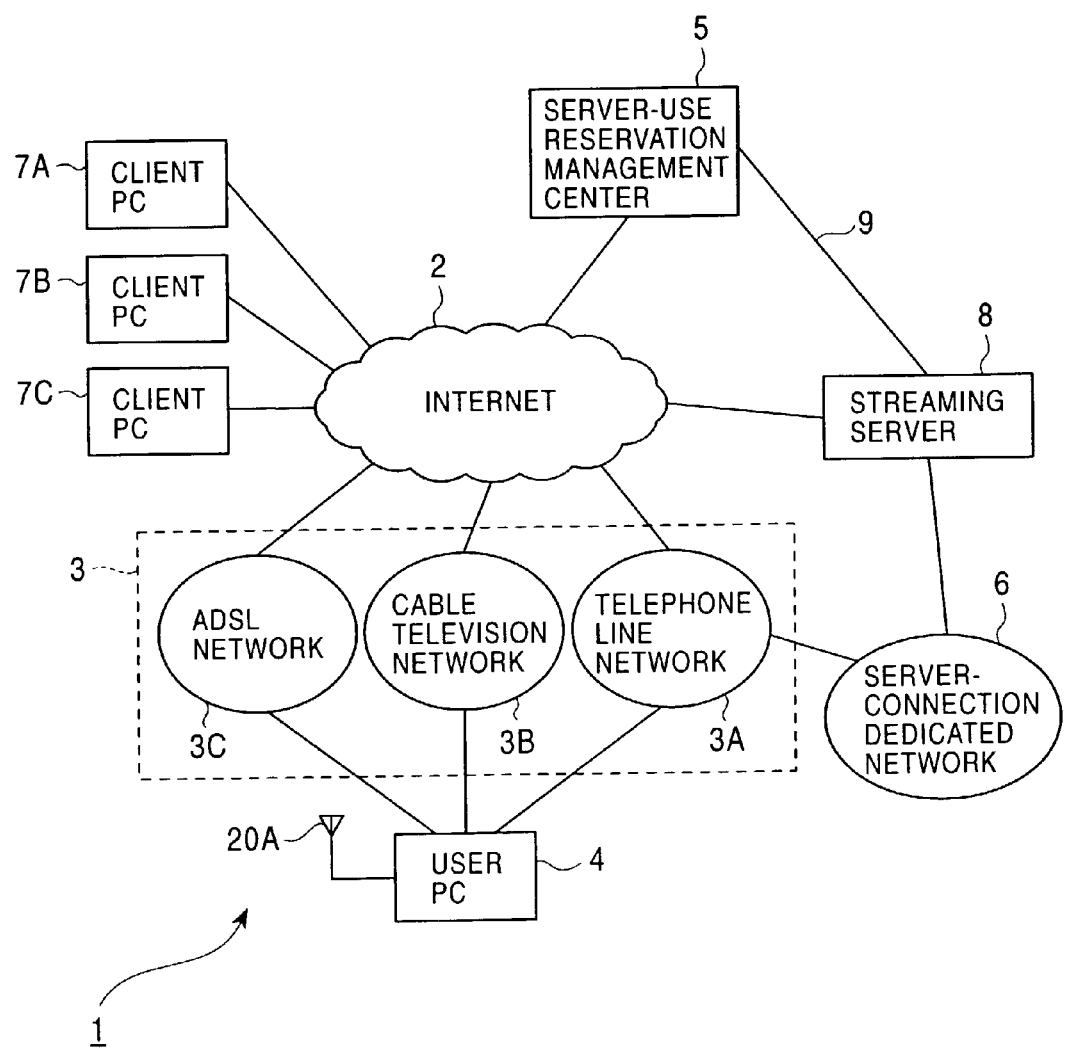
FIG. 1 is a schematic diagram illustrating the overall configuration of a content distribution system according to an embodiment of the present invention.

(1) Content Distribution System (1-1) Overall Configuration of Content Distribution System In FIG. 1, reference numeral 1 indicates a content distribution system configured in accordance with the present invention. Personal casting services, which are described below, are implemented by the content distribution system 1.

The content distribution system 1 is formed of the following elements. A user PC 4, which serves as a content provider, is connected to the Internet 2 via an Internet service provider (ISP) (not shown) and a public line network 3 (a telephone line network 3A, a cable television network 3B, or an asymmetric digital subscriber line (ADSL) network 3C). A server-use reservation management center 5 is connected to the Internet 2. A streaming server 8 distributes the content received from the user PC 4 via the public line network 3 or a server-connection dedicated network 6 to a plurality of client PCs 7A, 7B, and 7C via the Internet 2.

In this case, when transmitting the content to the streaming server 8, the user PC 4 makes, for example, a point-to-point protocol (PPP) connection with an access port of the server-connection dedicated network 6 via the telephone line network 3A of the public line network 3 so as to establish a transmission channel with the streaming server 8, thereby reliably transmitting the content to the streaming server 8 via the transmission channel.

Alternatively, the user PC 4 is able to connect to the streaming server 8 from the public line network 3 via the ISP and the Internet 2. In this case, the user PC 4 transmits the content to the streaming server 8 via a transmission channel of an available network selected from the telephone line network 3A, the cable television network 3B, and the ADSL network 3C.

The streaming server 8 transmits the content received from the user PC 4 via the server-connection dedicated network 6 or the Internet 2 to the plurality of client PCs 7A, 7B, and 7C via the Internet 2.

The streaming server 8 is also connected with the server-use reservation management center 5 via a dedicated line 9. Accordingly, when performing authentication processing, the streaming server 8 is able to send and receive authentication data to and from the user PC 4 and the client PCs 7A, 7B, and 7C via the dedicated line 9.

In practice, the user PC 4 requests the server-use reservation management center 5 to reserve the time slot when the user wishes to use the streaming distribution function of the streaming server 8. Accordingly, the user PC 4 makes a reservation for the use of the streaming server 8 via the server-use reservation management center 5.

When the reserved time is reached, the streaming server 8 receives the content transmitted from the user PC 4 via the server-connection dedicated network 6, and stores it in a buffer. At the same time, the streaming server 8 reads the content from the buffer and distributes it to the requested client PCs 7A, 7B, and 7C.

According to the above-configured content distribution system 1, a personal broadcast station, i.e., personal casting services, can be implemented in which the content transmitted from the user PC 4 is provided to the client PCs 7A, 7B, and 7C in real time via the streaming server 8 in a predetermined reserved time slot.

In this embodiment, the streaming server 8 provided with a streaming distribution function is employed. However, a server having another type of function may be used as long as it can provide the content in real time.

(1-2) Configuration of User PC

A description is now given of the configuration of the user PC 4, which is used, for example, when transmitting the content, such as live-music content, captured by a content provider, which serves as a broadcaster, to the streaming server 8.

Figure 2:
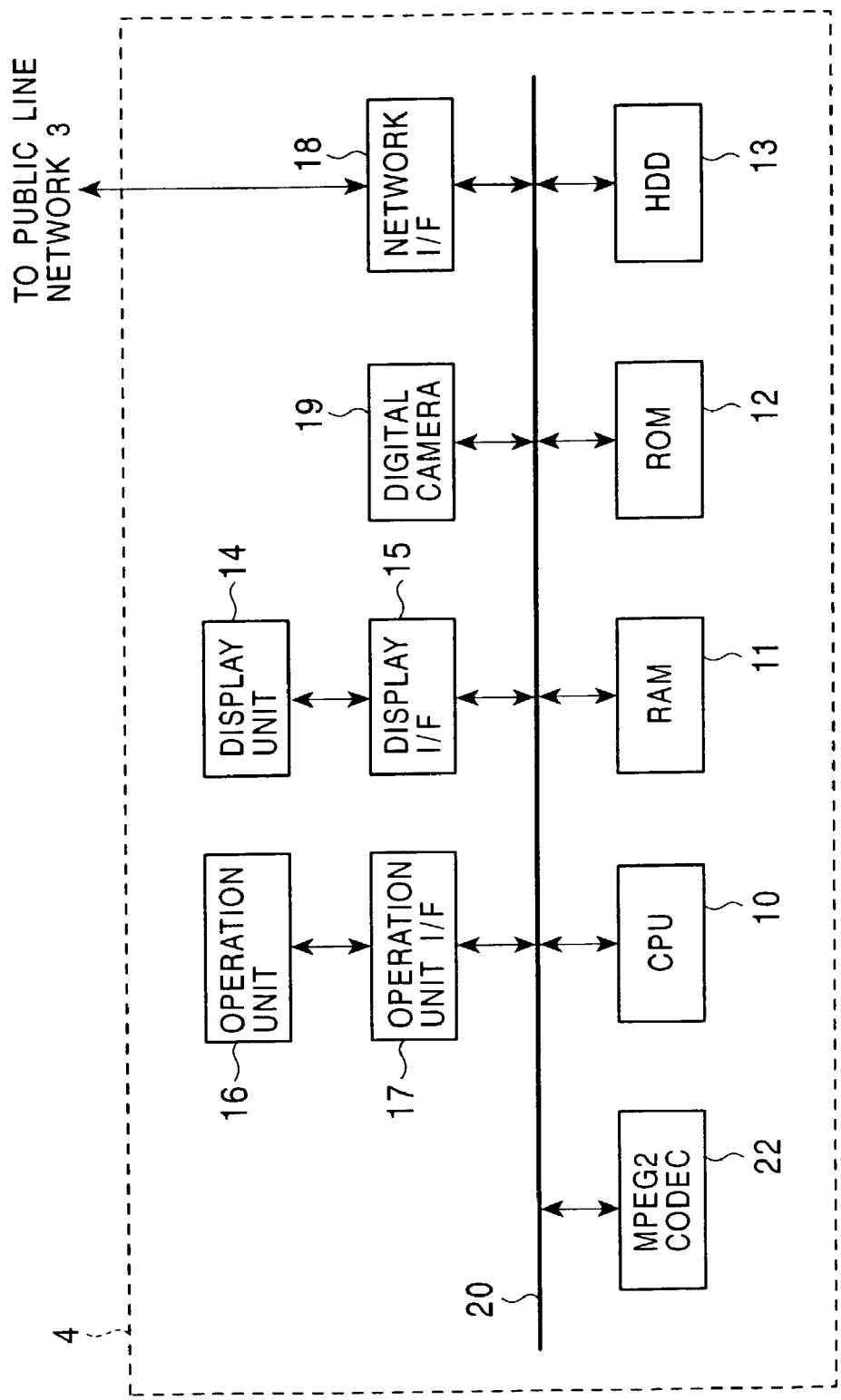
FIG. 2 is a block diagram illustrating the circuit configuration of a user PC.

As shown in FIG. 2, the user PC 4 includes the following elements. A central processing unit (CPU) 10 executes various types of computation processing and also controls the individual circuits. A random access memory (RAM) 11 is used as a work area for the CPU 10. A read only memory (ROM) 12 stores a series of programs executed by the CPU 10. A hard disk 13 stores an operating system (for example, "Windows95/98/2000 " (Microsoft Corporation)) to be executed by the CPU 10 and various programs, such as application programs. A display unit 14, such as a liquid crystal display, receives and displays the processing result obtained by the CPU 10 via a bus 20 and a display interface 15. An operation unit 16 including a keyboard, a mouse, and operating buttons, such as a rotatable and pressable jog dial (described below), is used by the content provider for inputting instructions. An operation unit interface 17 sends an instruction input from the operation unit 16 to the CPU 10 via the bus 20. A network interface 18 sends and receives via the public line network 3 data to and from an external device connected to the Internet 2 (FIG. 1) or the server-connection dedicated network 6. A digital video camera 19 is integrally attached to the user PC 4. A moving picture experts group 2 (MPEG2) codec 22 compresses the content according to the MPEG2 standards. The CPU 10 reads and writes data from and into the hard disk 13. Accordingly, the hard disk 13 is also used for storing the content and the various types of control data.

Figure 3A:
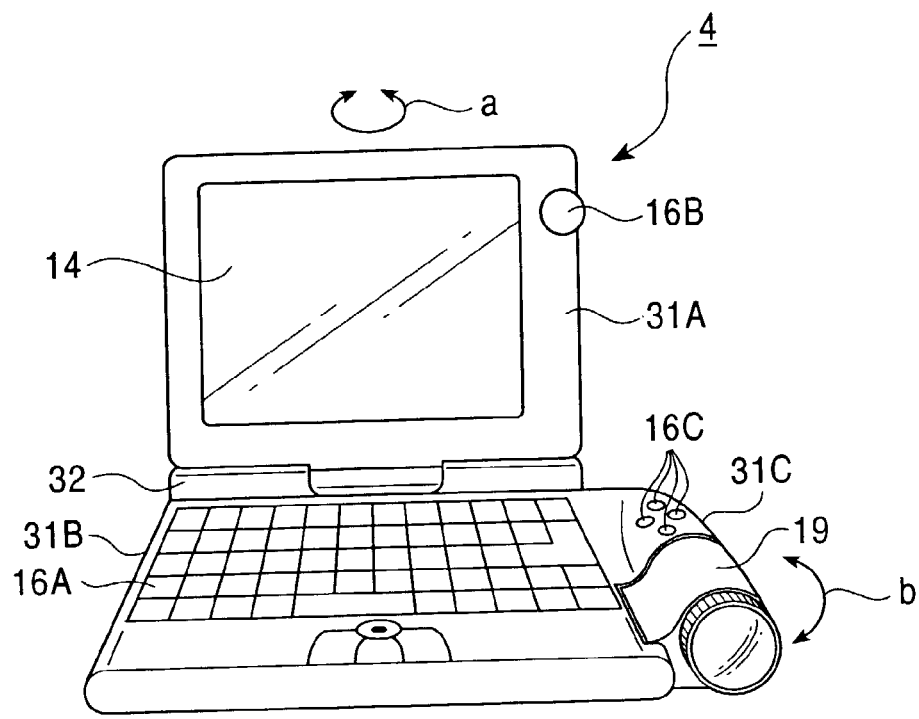
FIGS. 3A and 3B are perspective views illustrating the external configurations of the user PC.

The user PC 4 includes, as shown in FIG. 3A, a display casing 31A provided with the display unit 14, such as a liquid crystal display, and a keyboard casing 31B provided with a keyboard 16A. The display casing 31A and the keyboard casing 31B are interconnected to each other so that they are pivotable via a hinge 32.

Figure 3B:
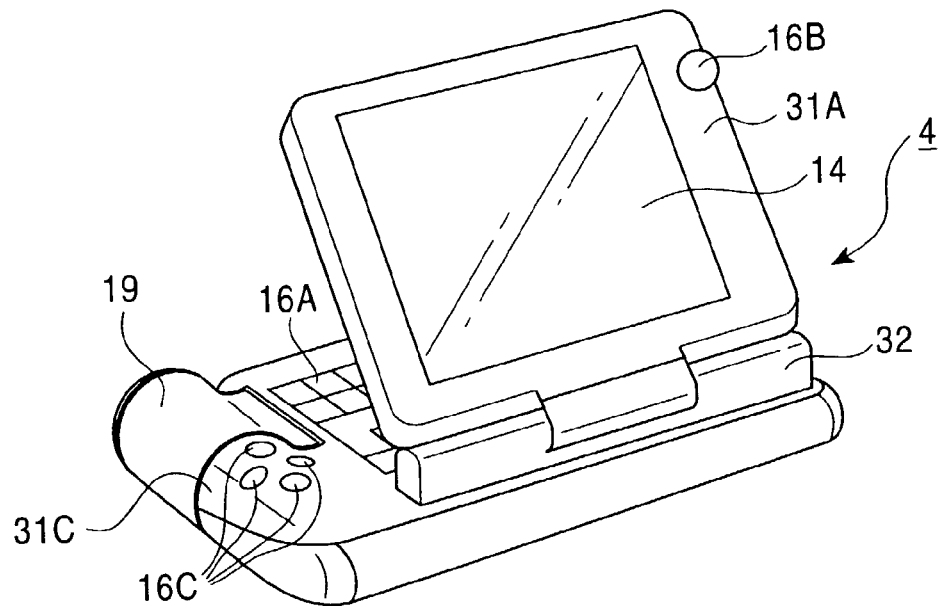

The display casing 31A is attached to the keyboard casing 31B such that it is rotatable in the directions indicated by the arrows a in FIG. 3A. The display casing 31A can also be used, as shown in FIG. 3B, in the state in which the display casing 31A is rotated by 180 degrees. A rotatable and pressable jog dial 16B is attached at the upper right side of the display casing 31A.

An operating button casing 31C on which a plurality of (four) operating buttons 16C are disposed is attached to the right side of the keyboard casing 31B. A digital video camera 19 is also supported by one point of the right side of the keyboard casing 31B such that it is rotatable in the directions indicated by the arrows b in FIG. 3A.

Figure 4A:
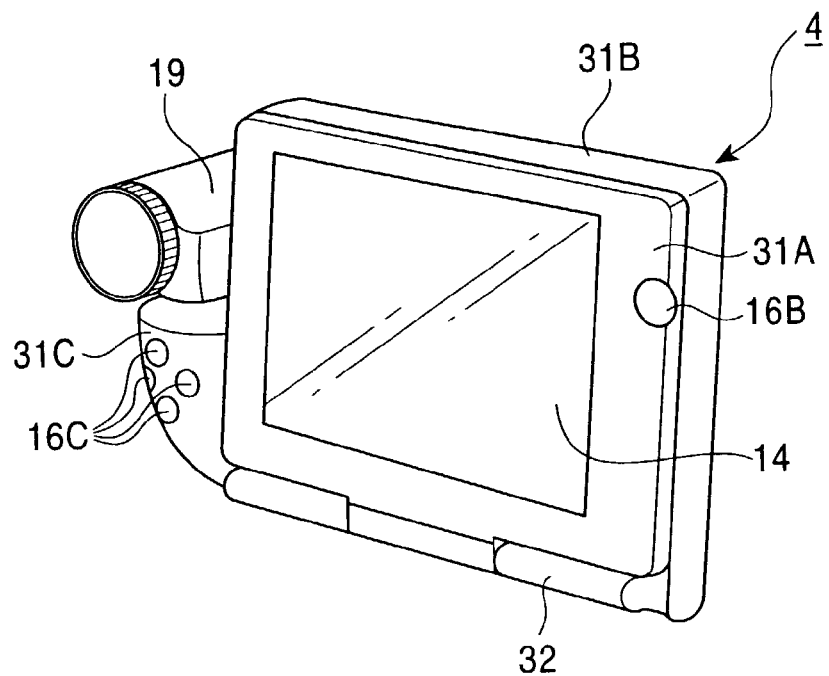
FIGS. 4A and 4B are perspective views illustrating the external configurations of the user PC.

The user PC 4 can also be employed in the state shown in FIG. 4A, in which case, the content provider is able to capture an image of himself/herself by using the digital video camera 19 while holding the user PC 4. In this case, the content provider can visually check himself/herself in the display unit 14 while facing the display unit 14.

When the user PC 4 is used in this state, however, since the keyboard 16A is positioned at the back of the display unit 14, it is difficult for the content provider to correctly operate the keyboard 16A.

Considering this point, the user PC 4 is configured such that instructions concerning image capturing performed by the digital video camera 19 (for example, start, stop, zoom, add the effect, store the content, send, etc.) can be input by operating the jog dial 16B or the operating buttons 16C.

Figure 4B:
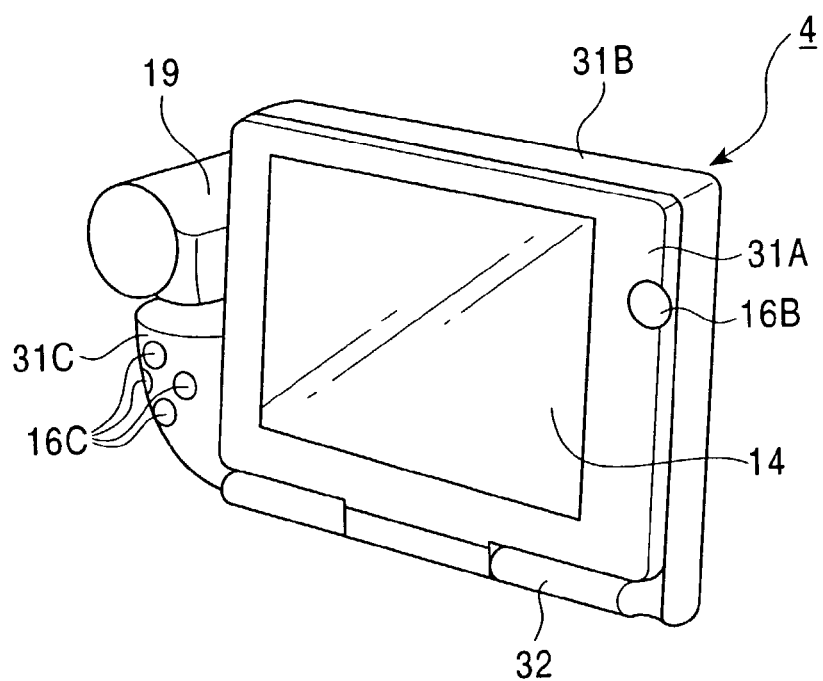

The user PC 4 can also be employed in the state shown in FIG. 4B. In this case, the content provider is able to capture an image of a subject in front of the user PC 4 by using the digital video camera 19 while holding the user PC 4 and visually checking the subject on the display unit 14.

In the user PC 4 (FIG. 2), when power is supplied, the CPU 10 reads the various programs stored in the ROM 12 or the hard disk 13 and executes them, thereby performing various types of processing, such as image capturing, content processing, sending processing of the content to the streaming server 8, and world wide web (WWW) browsing.

Figure 5:
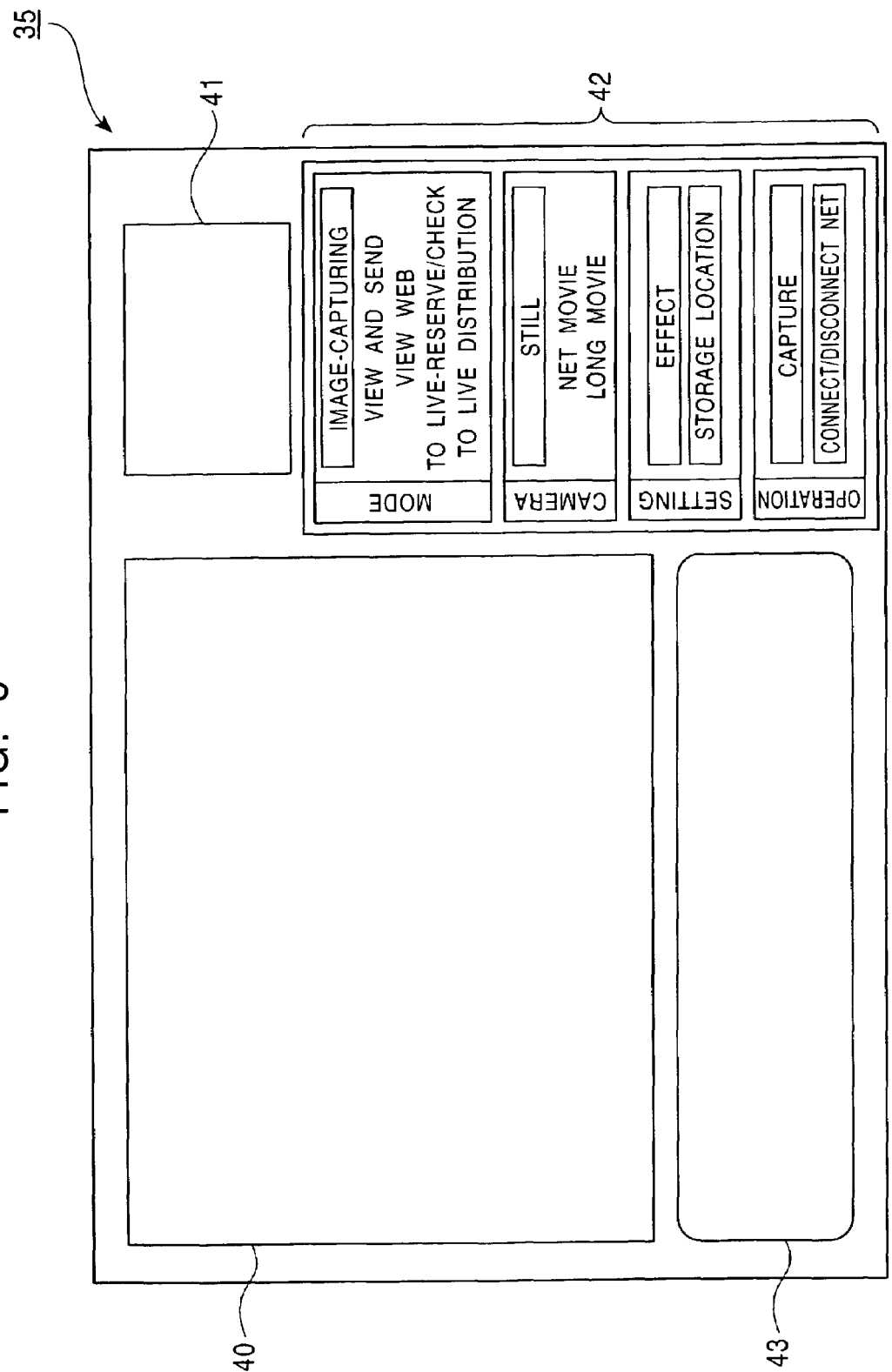
FIG. 5 illustrates the initial screen when an application program is started in the user PC.

A description is now given of various functions to be implemented by executing predetermined processing by the CPU 10 of the user PC 4 according to the above-described set of programs. In the user PC 4, an initial screen 35, such as that shown in FIG. 5, is displayed on the display unit 14 under the control of the CPU 10.

The initial screen 35 is provided with a large main-image display area 40 on which an image captured by the digital video camera 19 is displayed and a small sub-image display area 41 on which a previously captured preview image is displayed. A graphical user interface (GUI) 42 for allowing the user to select one of the main items, such as "mode", "camera", "setting", and "operation", is provided below the sub-image display area 41. A status window 43 in which the various statuses of the user PC 4 are shown is provided below the main-image display area 40.

The main item, "mode", of the GUI 42 includes five modes, such as an image-capturing mode (mode when "image-capturing" is selected), an upload mode (mode when "view and send" is selected), a web check mode (mode when "view web" is selected) a live reserve/check mode (mode when "to live-reserve/check" is selected), and a live distribution mode (mode when "to live distribution" is selected). It should be noted that the image-capturing mode is selected in the initial state when the user PC 4 is started.

The image-capturing mode is the mode for performing image capturing by using the digital video camera 19 of the user PC 4. When the image-capturing mode is selected, or in the initial state, the CPU 10 displays an image-capturing mode screen 50, such as that shown in FIG. 6A, on the display unit 14.

As in the above-described initial screen 35 (FIG. 5), in the image-capturing screen 50, a main-image display area 60 and a sub-image display area 61 are provided, and an image which is currently captured is displayed in the main-image display area 60, and a previously captured image preview is displayed on the sub-image display area 61.

A GUI 62 similar to the GUI 42 on the initial screen 35 is displayed on the image-capturing mode screen 50. The GUI 62 is also provided with main items, such as "mode", "camera", "setting", and "operation", as shown in FIG. 6B.

Each of the main items is provided with a plurality of sub items. By rotating the jog dial 16B of the display casing 31A, a focus F indicated by the solid frame in FIG. 6B is moved on the sub items. After the focus F is moved to a desired sub item, the selected sub item can be determined by pressing the jog dial 16B.

In the image-capturing mode, predetermined commands (for example, commands for selecting and setting effect items, which produce special effects on a currently captured image) are pre-assigned to the operating buttons 16C (FIGS. 3 and 4) provided for the operating button casing 31C.

Accordingly, the content provider is able to perform various operations in the image-capturing mode simply by using the jog dial 16B or the operating buttons 16C without using the keyboard 16A. Thus, even if the user PC 4 is positioned such that it is difficult to use the keyboard 16A, for example, in the states shown in FIGS. 4A and 4B, the image-capturing operation can be easily performed.

In the image-capturing mode, commands for selecting and setting the effect items, which are used for producing special effects on a currently captured image, are pre-assigned to the operating buttons 16C as a default. Other types of commands may be pre-assigned to the operating buttons 16C, or other commands may be pre-assigned to the operating buttons 16C in another mode. In this case, the operability of the user PC 4 is significantly increased.

In the image-capturing mode, the current status of the user PC 4 (for example, the remaining amount of the battery, the storage space of the hard disk 13, etc.) and the processing state in the selected mode (for example, the data size of a currently captured image, the specified storage location, the command type assigned to the operating buttons 16C, etc.) are displayed in the status window 63.

Figure 7A:
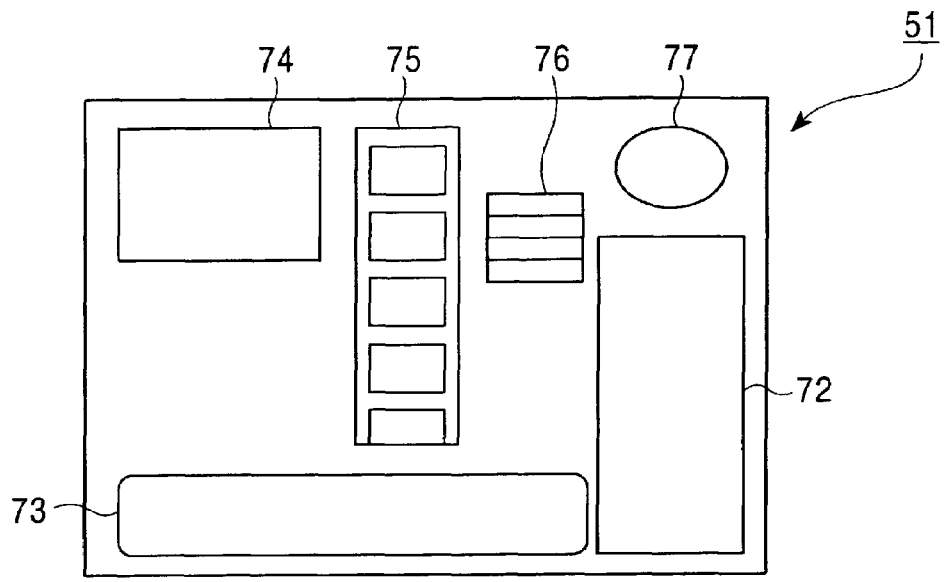
FIGS. 7A through 7C illustrate the overall configuration of an upload mode screen.

The upload mode is the mode for presenting the content captured in the above-described image-capturing mode to the content provider on the display unit 14, or sending the content image data to the streaming server 8 of a predetermined upload system connected to the Internet 2. In this case, the CPU 10 displays an upload mode screen 51 shown in FIG. 7A on the display unit 14.

Figure 6A:
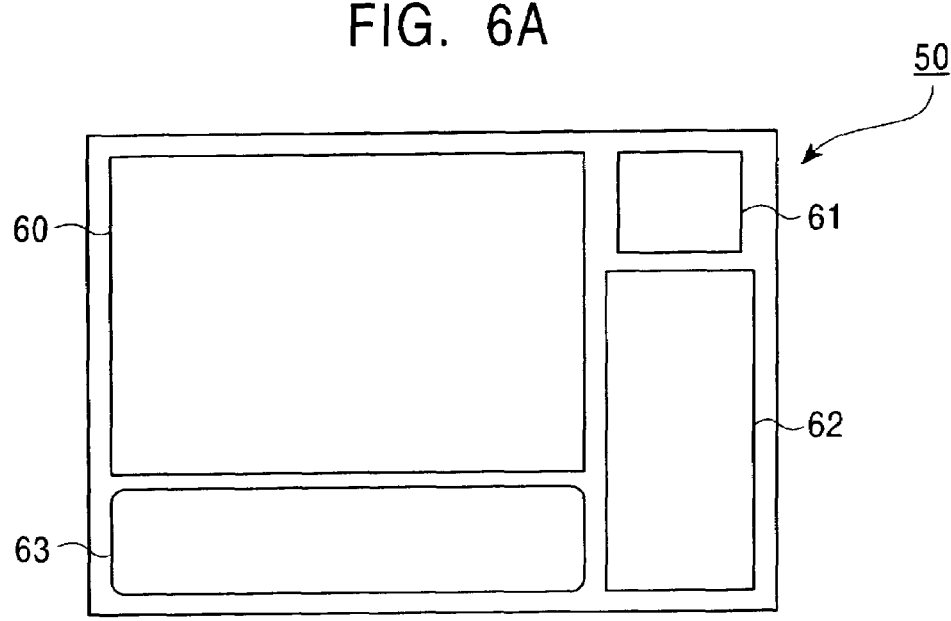
FIGS. 6A and 6B illustrate the overall configuration of an image-capturing mode screen.
Figure 6B:
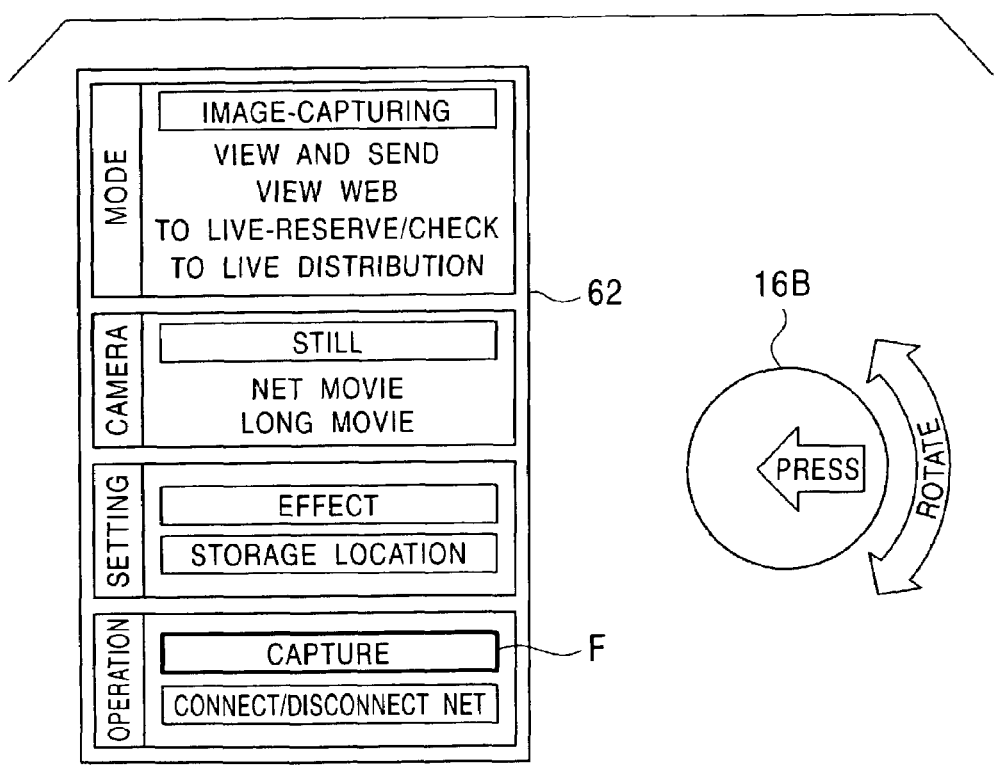

The upload mode screen 51 is provided with a GUI 72 and a status window 73 similar to the counterparts of the image-capturing mode (FIG. 6A). Also, a preview area 74, a list display area 75 in which a plurality of typical still images of the items of contents are displayed, and a sending capsule icon 77 are provided for the upload mode screen 51.

Figure 7B:
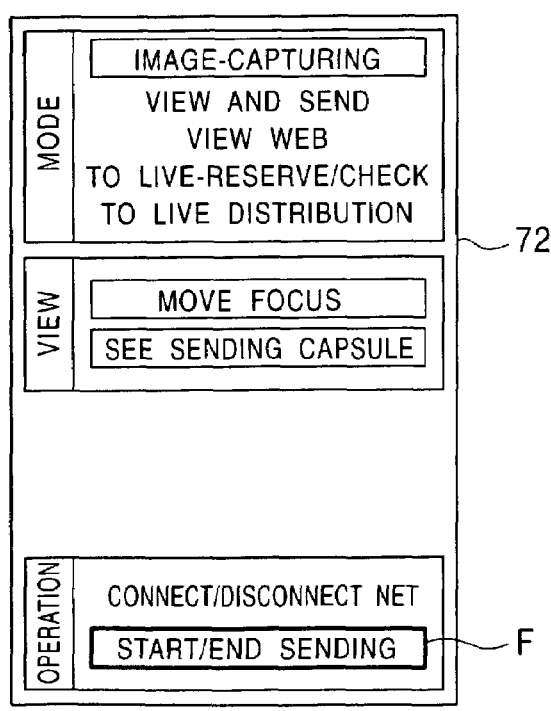

In the GUI 72 of the upload mode screen 51, as shown in FIG. 7B, items, such as "mode", "operation", and "view", are indicated.

The item "operation" includes sub items, such as "connect/disconnect net" for providing an instruction to connect or disconnect to or from the Internet 2 and "start/end sending" for providing an instruction to start or finish sending the content. The item "view" includes sub items, such as "move focus" for providing an instruction to move the focus F to the list display area 75 and "see sending capsule" for checking the items of content, i.e., for presenting the list of the selected items of content to the content provider.

As in the image-capturing mode 50 (FIG. 6B), in the GUI 72, the focus F is moved on the sub items by the rotation of the jog dial 16B of the display casing 31A, and after the focus F is moved to a desired sub item, the desired sub item is selected by pressing the jog dial 16B.

In the upload mode, commands for starting and stopping the playback of the content displayed in the preview area 74, and a command for providing an instruction to display a still image are pre-assigned to the operating buttons 16C (FIGS. 3A through 4B). The file name, the file size, the format (Joint Photographic Experts Group (JPEG) or MPEG) of the image data, and the information of the currently designated destination (server name and the Uniform Resource Locator (URL) to which the content is to be uploaded), etc., are displayed in the status window 73.

The CPU 10 moves the focus F to the item "move focus" according to the rotating operation on the jog dial 16B by the content provider, and, when the item "move focus" is selected by the pressing of the jog dial 16B, the CPU 10 moves the focus F to the list display area 75.

When rotating the jog dial 16B while the focus F is positioned in the list display area 75, the content provider is able to move the focus F on the still images of the list display area 75. Then, after moving the focus F to a desired still image, the content provider presses the jog dial 16B to select the desired still image to be sent.

Figure 7C:
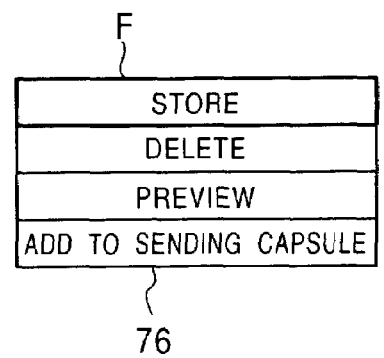

At this time, the CPU 10 displays a sub-GUI 76 next to the list display area 75, and moves the focus F on the items of the sub-GUI 76, as shown in FIG. 7C.

The sub-GUI 76 includes items, such as "store", "delete", "preview", and "add to sending capsule". If the item "add to sending capsule" is selected with the focus F by the rotation and the pressing of the jog dial 16B, the CPU 10 adds the content selected from the list display area 75 to the list of the content in the sending capsule icon 77.

Thereafter, the focus F is returned to the GUI 72 by the content provider, and when the item "start/end sending" is selected with the focus F, the CPU 10 sends all the items of content included in the sending capsule icon 77 to a predetermined upload server.

The web check mode is the mode for performing browsing by connecting the user PC 4 to the Internet 2. When the web check mode is selected, the CPU 10 displays a web check mode screen 52, such as that shown in FIG. 8A, on the display unit 14.

The web check mode screen 52 is provided with a GUI 82 and a status window 83 similar to the counterparts of the image-capturing mode screen 50 (FIG. 6A). The web check mode screen 52 is also provided with a browser display area 80 for displaying a web browser and a URL display column 84 for indicating the URL of the resource displayed in the browser display area 80.

When the web check mode is selected, the CPU 10 reads browser software (for example, Internet Explorer (Microsoft Corporation) or Netscape Navigator (Netscape)) from the hard disk 13, and executes the read software, thereby displaying a browsing image on the browser display area 80 according to the browser software.

Figure 8A:
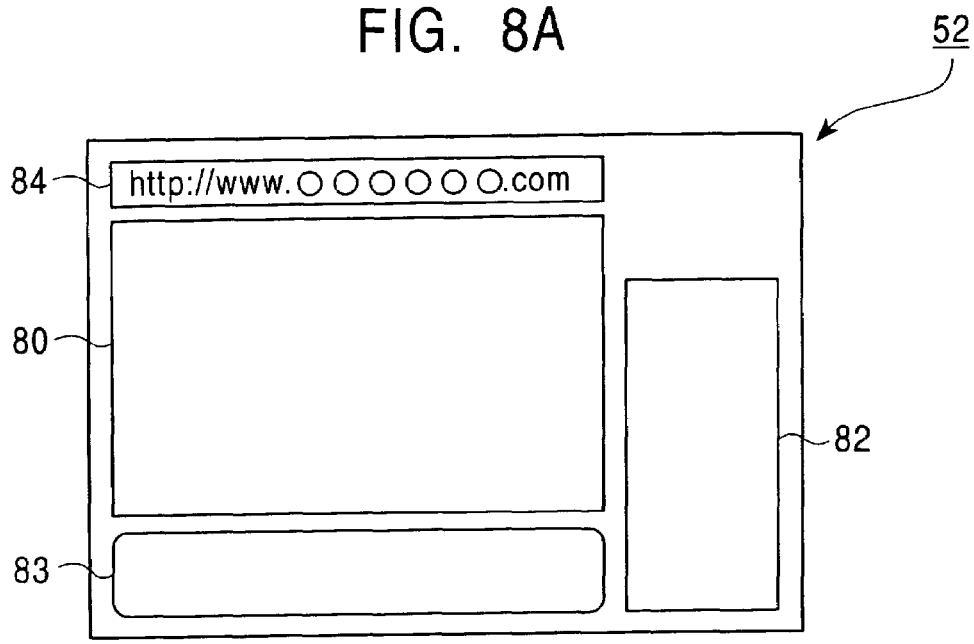
FIGS. 8A and 8B illustrate the overall configuration of a web check mode screen.
Figure 8B:
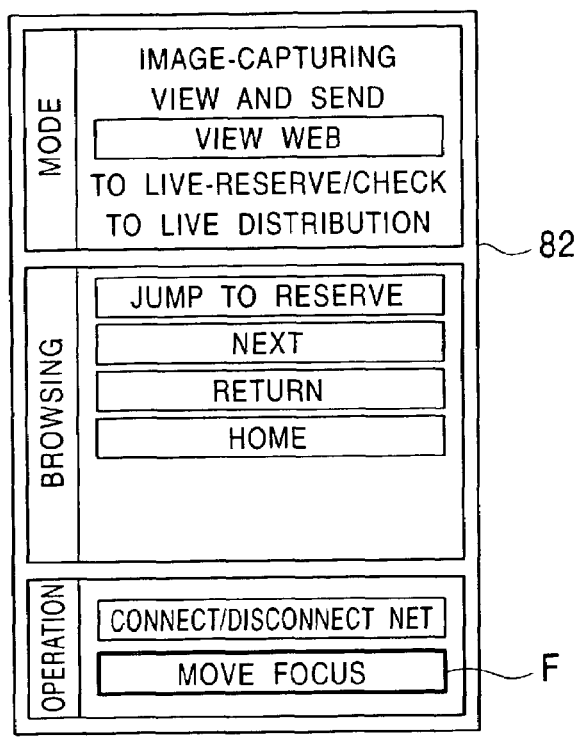

As shown in FIG. 8B, the item "browsing" is indicated in the GUI 82 of the web check mode screen 52 instead of the items "setting" and "camera" indicated in the initial screen 35.

The item "browsing" includes sub items, such as "jump to reserve" for providing an instruction to jump to a predetermined web page, "next" and "return" for operating the browser, and so on. In this web check mode, regular browsing processing, such as inputting a URL to perform browsing, can also be executed.

As in the image-capturing screen 50, the focus F is moved to a desired sub item in the GUI 82 by the rotation of the jog dial 16B of the display casing 31A, and the desired sub item is selected by the pressing of the jog dial 16B.

Figure 9A:
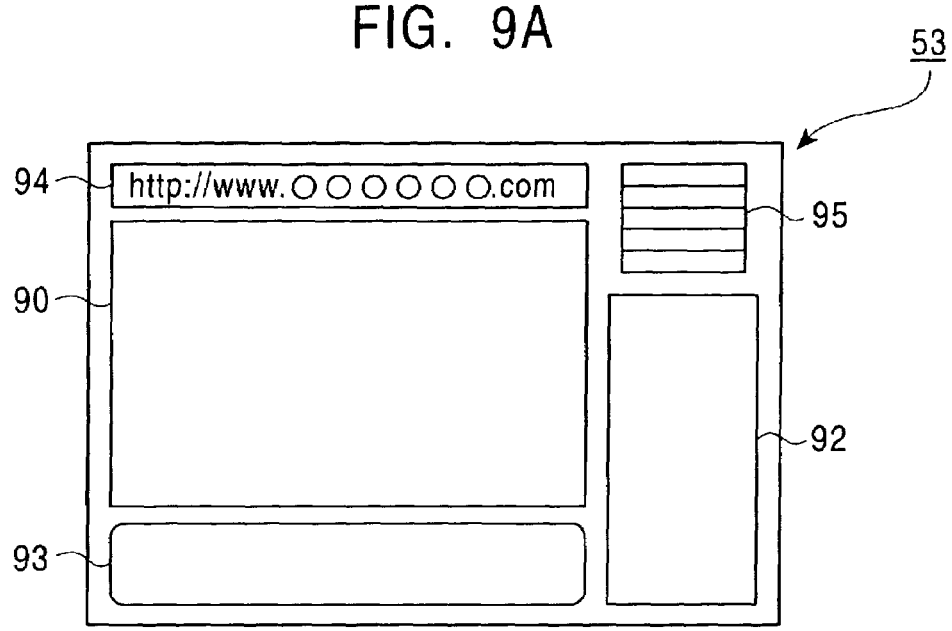
FIGS. 9A and 9B illustrate the overall configuration of a live reserve/check mode screen.

The live reserve/check mode is the mode for reserving the time slot during which a personal live broadcast of the content is performed by the stream distribution function of the streaming server 8. When the live reserve/check mode is selected, the CPU 10 displays a live reserve/check mode screen 53, such as that shown in FIG. 9A, on the display unit 14.

The live reserve/check mode screen 53 is provided with a browser display area 90, a GUI 92, a status window 93 and a URL display column 94 similar to the counterparts of the web check mode screen 52 (FIG. 8A). The live reserve/check mode screen 53 is also provided with a reserve list display area 95.

Figure 9B:
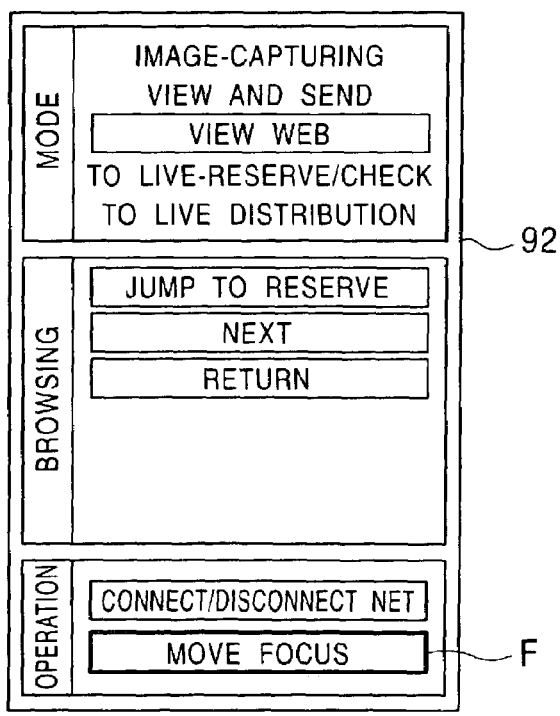

As in the GUI 82 of the web check mode screen 52 (FIG. 8B), items "mode", "operation", and "browsing" are provided with the live reserve/check mode screen 53, as shown in FIG. 9B. The item "browsing" includes sub items, such as "jump to reserve" for providing an instruction to jump to the predetermined web page for making a reservation for a live broadcast, "next" and "return" for operating the browser, and so on.

As in the web check mode screen 52, the focus F is moved to a predetermined sub item in the GUI 92 by the rotation of the jog dial 16B of the display casing 31A, and then, the desired sub item is selected by the pressing of the jog dial 16B.

The web page for making a live-broadcast reservation is the page on a live reserve screen stored in the hard disk of a live casting server (described below) in the server-use reservation management center 5.

When the item "jump to reserve" is selected with the focus F by the content provider, the CPU 10 of the user PC 4 accesses the live casting server of the server-use reservation management center 5 so as to send reservation request information to the live casting server or receive various data concerning live reservation, such as downloading a live-reservation setting information file from the live casting server.

In the reserve list display area 95 of the live reserve/check mode screen 53, a list of items reserved in the server-use reservation management center 5 is displayed, and summary information, such as the time slot, which is set for each item, is also displayed.

When a desired reserved item is selected with the focus F from the reserve list display area 95 by the rotation and the pressing of the jog dial 16B, the CPU 10 of the user PC 4 controls the live casting server of the server-use reservation management center 5 to jump to the web page of the reserve check screen on which details of the reserved items are indicated. The live reservation processing performed between the CPU 10 of the user PC 4 and the server-use reservation management center 5 is discussed below.

The live distribution mode is the mode for distributing the content obtained by the digital video camera 19 of the user PC 4 to the client PCs 7A, 7B, and 7C in real time via the Internet 2 by using the stream distribution function of the streaming server 8 as if the content is distributed from a personal broadcast station.

Figure 10A:
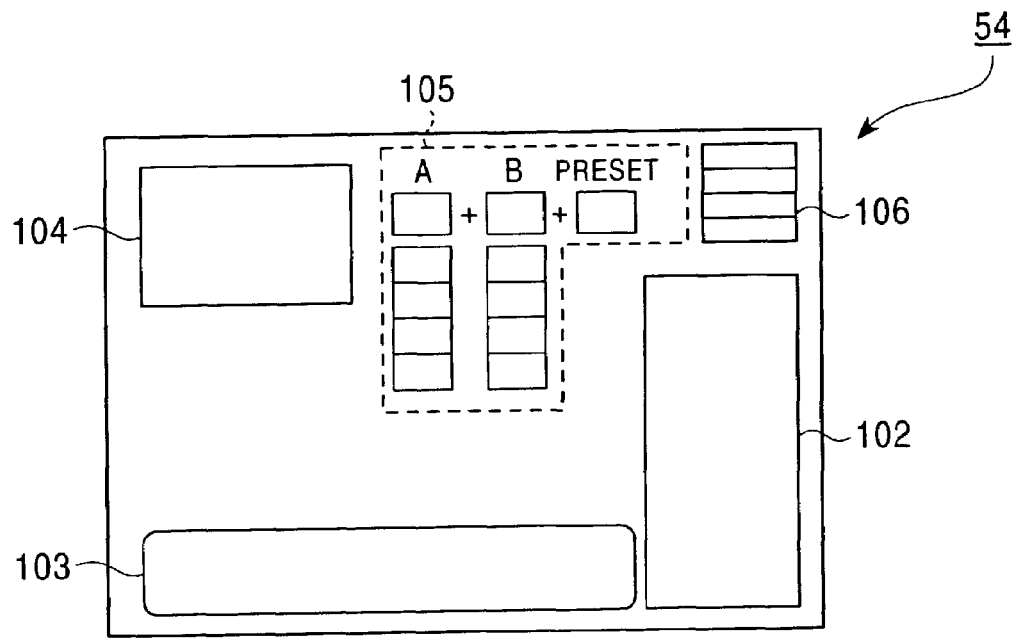
FIGS. 10A and 10B illustrate the overall configuration of a live distribution mode screen.

When the live distribution mode is selected by the content provider, the CPU 10 of the user PC 4 displays a live distribution mode screen 54, such as that shown in FIG. 10A, on the display unit 14.

In this live distribution mode screen 54, in addition to a GUI 102 and a status window 103, an effect-item display column 105 for allowing the user to select the type of special effect produced on moving picture data of a live distribution broadcast, a preview image display area 104 in which an effect image provided with the selected special effect is displayed, and a reserve list display column 106 in which the reserved programs are indicated. It should be noted that the effect image displayed in the preview image display area 104 is to be sent to the streaming server 8.

The status window 103 displays various items of information concerning the live distribution, such as on-air information indicating that a live broadcast is currently distributed, live distribution time information indicating the lapse of time from the live distribution start time, time information of the service provider in personal casting services, time information of the user PC 4, reserved time information indicating the reserved start time and the reserved end time, image size information, bit rate information indicating the transmission rate (bit rate) of the distribution data, title information indicating the title name of the content, connecting-server information indicating the streaming server 8 and the channel thereof, and the number-of-viewer information indicating the number of client PCs, such as the client PCs 7A, 7B, and 7C, that are currently receiving the content from the streaming server 8.

Figure 10B:
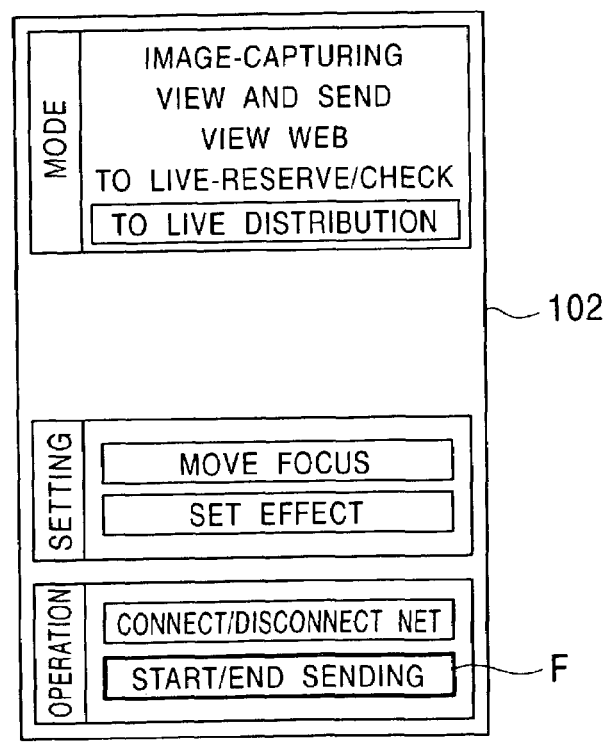

As shown in FIG. 10B, items, such as "mode", "operation", and "setting", are indicated in the GUI 102 of the live distribution mode screen 54. The item "operation" includes sub items, such as "connect/disconnect net" for providing an instruction to connect or disconnect to or from the Internet 2, and "start/end distribution" for providing an instruction to start or finish the live distribution.

The item "setting" includes sub items, such as "set effect" for selecting the type of effect produced on moving picture data of the content and "move focus" for moving the focus F to the effect-item display column 105.

The sub item "set effect" is for selecting the effect item to be produced on the moving picture data of the content and for displaying the selected effect item in the effect-item display column 105.

The sub item "move focus" is for moving the focus F to the effect-item display column 105. After the focus F is moved to a desired sub item in the effect-item display column 105 according to the rotation of the jog dial 16B, the desired sub item is selected by the pressing of the jog dial 16B.

When the item "start/end distribution" is selected with the focus F by the rotation and the pressing of the jog dial 16B, the CPU 10 of the user PC 4 establishes a transmission channel with the streaming server 8 by connecting to a dedicated line via the server-connection dedicated network 6 or connecting to the Internet 2 according to the reservation setting information file for the live distribution supplied from the live casting server of the server-use reservation management center 5 in the above-described live reserve/check mode.

Subsequently, the CPU 10 of the user PC 4 transmits the moving picture data of the content captured by the digital video camera 19 to the streaming server 8 in real time according to the details (for example, data transmission rate) set in the reservation setting information file.

As discussed above, the user PC 4 stores an application program provided with five functions, such as the image-capturing mode, the upload mode, the web check mode, the live reserve/check mode, and the live distribution mode, in the hard disk 13. The user PC 4 also stores an application program for automatically incorporating a reservation setting information file (described below) required for making a live distribution reservation, and an application program for executing the processing for connecting to the streaming server 8 for performing live distribution. Details of the functions implemented by executing such application programs are discussed below.

(1-3) Configuration of Server-Use Reservation Management Center

As discussed above, when the user PC 4, as a live distributor, sends the moving picture data of the content to the streaming server 8, it is necessary to make a reservation for using the streaming distribution function of the streaming server 8 in a scheduled time slot in the personal casting services implemented by the content distribution system 1.

A description is now given, with reference to FIG. 11, of the server-use reservation management center 5, which serves as a service provider, for managing reservations for the streaming server 8.

The server-use reservation management center 5 is formed of a live casting server 150, a reservation database 151, a user database 152, a network time protocol (NTP) server 153, a network interface 154, and a database server 155. These items are connected to each other via a LAN.

The server-use reservation management center 5 sends and receives data to and from the user PC 4 and the client PCs 7A, 7B, and 7C connected to the Internet 2 via the network interface 154, and also communicates with the streaming server 8 connected to the dedicated line 9 (FIG. 1).

The live casting server 150 manages the overall personal casting services, such as live distribution reservations, billing, and membership registration, in the personal casting services.

The live casting server 150 stores in the hard disk a registration web page for allowing a content provider to obtain the right to receive the personal casting services, a reservation-receiving web page for receiving reservations for live distribution performed by the content provider, a reservation-checking web page for checking or changing reservations by the content provider, and a program guide web page for presenting a program table of live distribution broadcasts to the client PCs 7A, 7B, and 7C. When there is a demand from the user PC 4 or the client PC 7A, 7B, or 7C, the live casting server 150 sends the corresponding web page to the user PC 4 or the client PC 7A, 7B, or 7C.

The reservation database 151 stores the live-distribution reservation statuses of the content reserved in the above-described live reserve/check mode and also stores reservation billing information.

In this case, the reservation database 151 stores a reservation table (not shown) in which reservation details including the reserved time slot, the channel, the transmission band (bit per second (BPS), etc., the user ID for identifying the user, billing flag information indicating whether the reserved item is billable, and the reservation ID used for performing authentication when a reservation is made are indicated in correspondence with each other according to the individual reserved items.

The various types of information indicated in the reservation table are written into the reservation database 151 when the reservation processing, which is discussed below, is performed by the live casting server 150, and such information is checked when the authentication processing, which is discussed below, is performed by the database server 155.

The user database 152 stores user information concerning the registered users having the right to enjoy the personal casting services (the content provider to provide the content via the user PC 4 or the client users to receive the content via the client PCs 7A, 7B, and 7C). More specifically, the user database 152 stores items for each registered user, i.e., the name, the user ID, the password, the e-mail address, the address, the telephone number (including the cellular telephone and the facsimile number), the credit card number, and the expiration period thereof.

The user information stored in the user database 152 is written when the membership registration processing, which is discussed below, is performed by the live casting server 150, and the user information is checked when the live distribution reservation, which is discussed below, is performed by the live casting server 150.

The NTP server 153 centrally manages the time information in the service providers, such as the server-use reservation management center 5 and the streaming server 8. Accordingly, the live casting server 150 and the streaming server 8 obtain the time information from the NTP server 153, and manages the start time and the end time of the live distribution based on the obtained time information.

It is necessary to perform such precise time control because services, such as live distribution, must be provided at the exact time. Thus, the reference time is uniquely determined in the service providers, and the server-use reservation management center 5 and the streaming server 8, which serve as the service providers, are operated together based on the same reference time.

There may be a difference between the time in the user PC 4 and the reference time in the service providers. If the user PC 4 does not identify this difference, there may be a time difference between the start time and the end time of the live distribution specified by the service providers and those assumed by the user PC 4.

Accordingly, the live casting server 150 calculates the above-described time difference based on the reference time obtained from the NTP server 153, and informs the user PC 4 of the calculated time difference when the user PC 4 makes a live distribution reservation.

When a connection request to use the streaming server 8 is made from the user PC 4 or another illegal user PC to the access port of the server-connection dedicated network 6, the database server 155 performs authentication processing based on a request from an access server (not shown) of the server-connection dedicated network 6 to check whether the corresponding PC is the legal user PC 4 which has actually made a reservation in the corresponding time slot.

When the database server 155 authenticates the PC (in this case, the user PC 4) as a legal user in the above-described authentication processing, a communication connection is established between the streaming server 8 and the user PC 4, and the user PC 4 requests the streaming server 8 to perform stream distribution processing.

In this case, the streaming server 8 requests the database server 155 to perform authentication processing to check whether the user PC 4 is a legal user PC which has actually made a reservation.

Accordingly, in response to a request from the streaming server 8, the database server 155 performs authentication processing. The database server 155 performs authentication processing by referring to the reservation database 151, and details of the authentication processing are given below.

(1-4) Configuration of Streaming Server

As discussed above, the streaming server 8 receives the moving picture data transmitted from the legal user PC 4 via a transmission channel established by connecting to a dedicated line (via the server-connection dedicated network 6) or to the Internet 2 (via the public line network 3), and distributes the data to the client PCs 7A, 7B, and 7C which have requested the streaming server 8 to distribute the content.

The streaming server 8 includes a plurality of channels for a plurality of corresponding distribution environments, i.e., according to whether the streaming server 8 is connected to the dedicated line or the Internet 2. With this configuration, even if a plurality of content providers access the streaming server 8 as live distributors in the same time slot, the streaming server 8 is able to perform the live distribution processing so that the content providers can distribute the content at the same time.

In practice, in the streaming server 8, the maximum number of users to which the content is to be distributed, the transmission band (for example, 20 kbps, 34 kbps, 45 kbps, 80 kbps, 220 kbps, etc.), and the usage fee are preset according to the individual channels. Then, the content distributor for performing live distribution via the streaming server 8 is able to select a desired distribution channel.

As discussed above, the streaming server 8 distributes the moving picture data of the content transmitted from the user PC 4, which serves as a content provider. The streaming server 8 also reads commercial content from, for example, the hard disk 13, and distributes it in an unoccupied time slot or in a time slot between time slots used for distributing the content.

The streaming server 8 also manages the reserved time slots and the number of client PCs to which the content is to be distributed according to the reservation details determined between the user PC 4 and the server-use reservation management center 5.

(1-5) Communication Connection between Streaming Server and User PC for Live Distribution In the content distribution system 1, when performing live distribution, it is necessary to connect the user PC 4 and the streaming server 8 (FIG. 1) via the dedicated line or the Internet 2 so as to ensure a transmission channel for transmitting the content from the user PC 4 to the streaming server 8.

If the user PC 4 possesses a distribution environment which allows the connection not only to the telephone line network 3A, but also to the cable television network 3B or the ADSL network 3C, the user PC 4 selects a desired line from the public line network 3 so as to transmit the content to the streaming server 8 through a transmission channel via the dedicated line or the Internet 2.

The server-connection dedicated network 6 is the network specifically used for performing live distribution in the personal casting services provided by the content distribution system 1.

As described above, in the content distribution system 1, the dedicated line or the Internet 2 is suitably selected for connecting the user PC 4 and the streaming server 8 according to the distribution environment of the user PC 4. Thus, the content provider is able to select the optimal distribution channel when making a reservation according to the distribution environment of the user PC 4.

In response to a request from a user to connect to the server-connection dedicated network 6, the access server of the server-connection dedicated network 6 requests the database server 155 (FIG. 11) to perform authentication processing to check whether the user PC 4 has a legal reservation.

If it is determined that the user PC is an unauthorized user PC based on the result of the authentication processing performed by the database server 155, the access server of the server-connection dedicated network 6 immediately disconnects the call from the PC.

However, even though a request from an authorized user PC is rejected, one of the lines of the server-connection dedicated network 6 becomes busy while authentication processing is performed.

Thus, if the maximum number of users who can access the server-connection dedicated network 6 is the same as the number of preset lines, the legal user PC 4 cannot connect to the server-connection dedicated network 6 when an unauthorized user simultaneously makes a plurality of calls to the access ports of the server-connection dedicated network 6 for the purpose of interfering with the personal casting services.

In the content distribution system 1, when providing personal casting services, the user PC 4 may be allowed to connect to the streaming server 8 before the live distribution start time according to the reservation details. In this case, the authentication processing and connection processing are performed on the user PC 4 before the live distributions start time, and when the live distribution start time is reached, the live distribution processing can be started via the user PC 4.

In this case, too, however, if, for example, continuous time slots are reserved by different users, the connection of the content provider who has reserved the earlier time slot and is currently distributing the content conflicts with the connection of the subsequent content provider who has reserved the later time slot and attempts to connect to the streaming server 8 before the live distribution start time. Accordingly, if the number of lines is the same as the maximum number of users, some users may not be able to connect to the streaming server 8 in such a situation.

Thus, the streaming server 8 sets the number of lines through which the users can be connected to the streaming server 8 to about twice as much as the maximum number of users who are allowed to connect to the streaming server 8 in the same time slot (for example, if the maximum number of users is 10, the number of lines is set to 20). With this arrangement, it is possible to reduce conflicts on the provision of services by the interference of unauthorized users. Also, even if one user who has reserved the earlier time slot conflicts with another user who has reserved the later time slot attempt to connect to the streaming server 8 at the same time, the conflict in the same line can be sufficiently prevented.

The server-connection dedicated network 6, which is used for connecting to the streaming server 8, is not restricted to the access ports to a network (for example, a public telephone network) of a single telecommunications carrier. Alternatively, access ports to the networks of a plurality of telecommunications carriers may be prepared.

In this case, the user PC 4 selects a desired telecommunications carrier to call the corresponding access port, thereby establishing the communication connection with the streaming server 8 via the server-connection dedicated network 6.

(1-6) Configuration of Client PC

As described above, the moving picture data of the content transmitted from the user PC 4 to the streaming server 8 in real time is distributed to the client PCs 7A, 7B, and 7C, which have requested the content, via the Internet 2.

Upon receiving the content from the streaming server 8, the client PCs 7A, 7B, and 7C are able to play back the content in real time by using a predetermined application program (for example, "Real Player" (RealNetworks), or "Windows Media Player" (Microsoft Corporation)).

(2) Operation of Content Distribution System

A description is given below of various types of processing performed in the content distribution system 1 for implementing the live casting services.

(2-1) Membership Registration

When performing live distribution by using the personal casting services, the content provider of the user PC 4 is required to conduct a membership registration procedure in the live casting server 150 of the server-use reservation management center 5 in order to obtain the right to perform live distribution in the personal casting services.

More specifically, the user PC 4 requests the live casting server 150 to view a personal casting service top page based on the URL directly input by the content provider in the URL display column 84 of the web check mode screen 52 (FIG. 8). Then, a personal casting service top page screen 160, such as that shown in FIG. 12, received from the live casting server 150, is displayed on the browser display area 80.

When requesting the live casting server 150 to view the personal casting service top page, the content provider may click the link button on the home page rather than inputting the URL, thereby allowing the content provider to jump to the personal casting service top page screen 160.

A program guide display area 160A, which is similar to a film roll, is provided substantially at the center of the personal casting service top page screen 160, and is scrolled in a ring-like shape in the vertical direction at a predetermined speed.

As a default, the program guide display area 160A shown when a "today's live" button 160B is clicked is set. The title "today's live (today's program)" and guide information of the programs (content) to be distributed that day are displayed by being sequentially scrolled in a ring-like shape as one of the film frames.

In the personal casting service top page screen 160, the scrolling direction of the program guide display area 160A can be changed or the scrolling operation can be stopped by clicking operating buttons 160Z. With this arrangement, the client user can easily select the guide information of a desired program, and can also visually check the information when the scrolling is stopped.

A "my studio" button 160D is also provided on the personal casting service top page screen 160, and when clicking the "my studio" button 160D, the web page hyperlinked to the "my studio" button 160D is sent from the live casting server 150 to the user PC 4.

Figure 13:
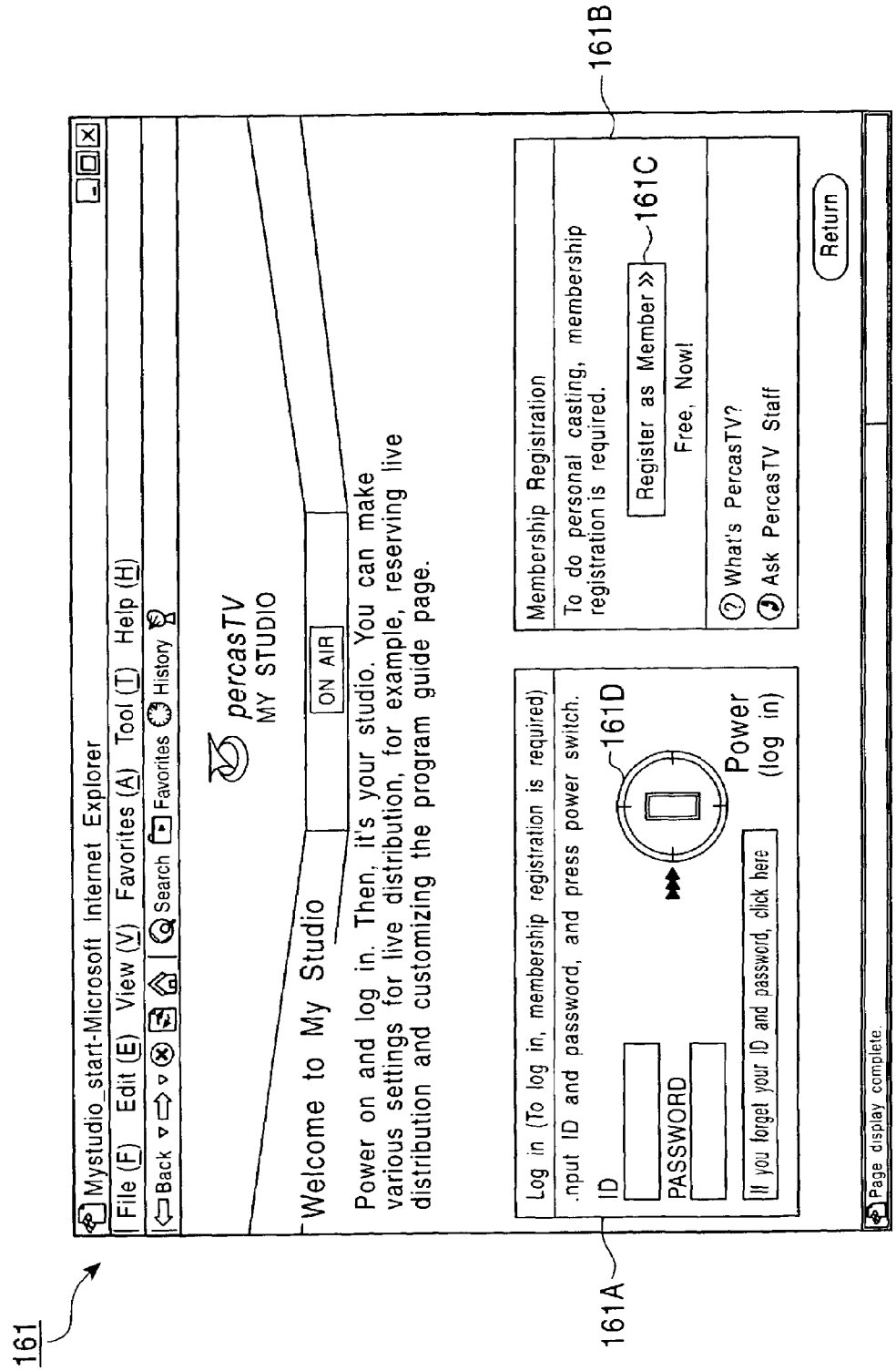
FIG. 13 illustrates a "my studio" screen.

The CPU 10 of the user PC 4 displays a "my studio" screen 161, such as that shown in FIG. 13, based on the web page received from the live casting server 150.

The "my studio" screen 161 is provided with a log-in display column 161A for instructing registered members to log in, and a membership registration column 161B for unregistered users. The registered members are instructed to input their user ID and the password in the log-in display column 161A. The unregistered users are instructed to click a "register as a member" button 161C in the membership registration column 161B so as to perform membership registration via the subsequent membership registration screen (not shown).

When the "register as a member" button 161C in the membership registration column 161B is clicked in the "my studio" screen 161, the CPU 10 of the user PC 4 receives the subsequent web page from the live casting server 150, and displays a membership registration input screen 161C, such as that shown in FIG. 14, based on the web page.

The membership registration input screen 161C is provided with input items and the corresponding input columns for performing membership registration.

In the personal casting services, two types of membership registrations are prepared, i.e., regular-membership registration simply for receiving live distribution from the streaming server 8 by using the above-described function of the client PCs 7A, 7B, and 7C, and premium-membership registration not only for receiving the live distribution, but also for using the personal casting services as live distributors. Accordingly, a regular/premium input column 210 and a premium exclusive input column 211 are provided in the membership registration input screen 161C.

In this membership registration input screen 161C, client users intending to register as regular members fill in the regular/premium input column 210 by using the client PCs 7A, 7B, and 7C.

In the membership registration input screen 161C, a cancel button 212 for canceling the input information, and a registration button 213 for registering the input information are provided. When the registration button 213 is clicked, the client PCs 7A, 7B, and 7C send the information filled in the input column 210 to the live casting server 150 via the Internet 2 as registration information.

When performing premium membership registration, the content provider checks the check box of the "premium membership registration", and fills in the input columns 210 and 211.

When the registration button 213 is clicked after inputting the items into the input columns 210 and 211 by the content provider, the CPU 10 of the user PC 4 creates a registration information file having the same content as the membership registration screen 161, and sends it to the live casting server 150 via the Internet 2. The CPU 10 also writes the registration information file into the hard disk 13.

Upon receiving the registration information file from the user PC 4 via the Internet 2, the live casting server 150 checks the content of the registration information file and determines whether to accept the registration.

In this case, if there is a blank item in which information is not filled, the live casting server 150 instructs the user PC 4 to re-input the information.

The live casting server 150 also accesses a credit check server of a credit company via the Internet 2 and checks whether the credit card in the registration information file is valid, and if so, the live casting server 150 accepts the registration.

When the registration is permitted, the live casting server 150 performs membership registration processing by writing the individual items of information into the user database 152, and then informs the user PC 4 via the Internet 2 that the membership registration processing has been completed.

(2-2) Distribution Reservation Registration

Upon completion of the above-described membership registration processing, the content provider of the user PC 4 performs reservation registration processing for reserving the time slot for distributing the content to the streaming server 8. This reservation registration processing is performed for the live casting server 150 of the user-use reservation management center 5.

Figure 16:
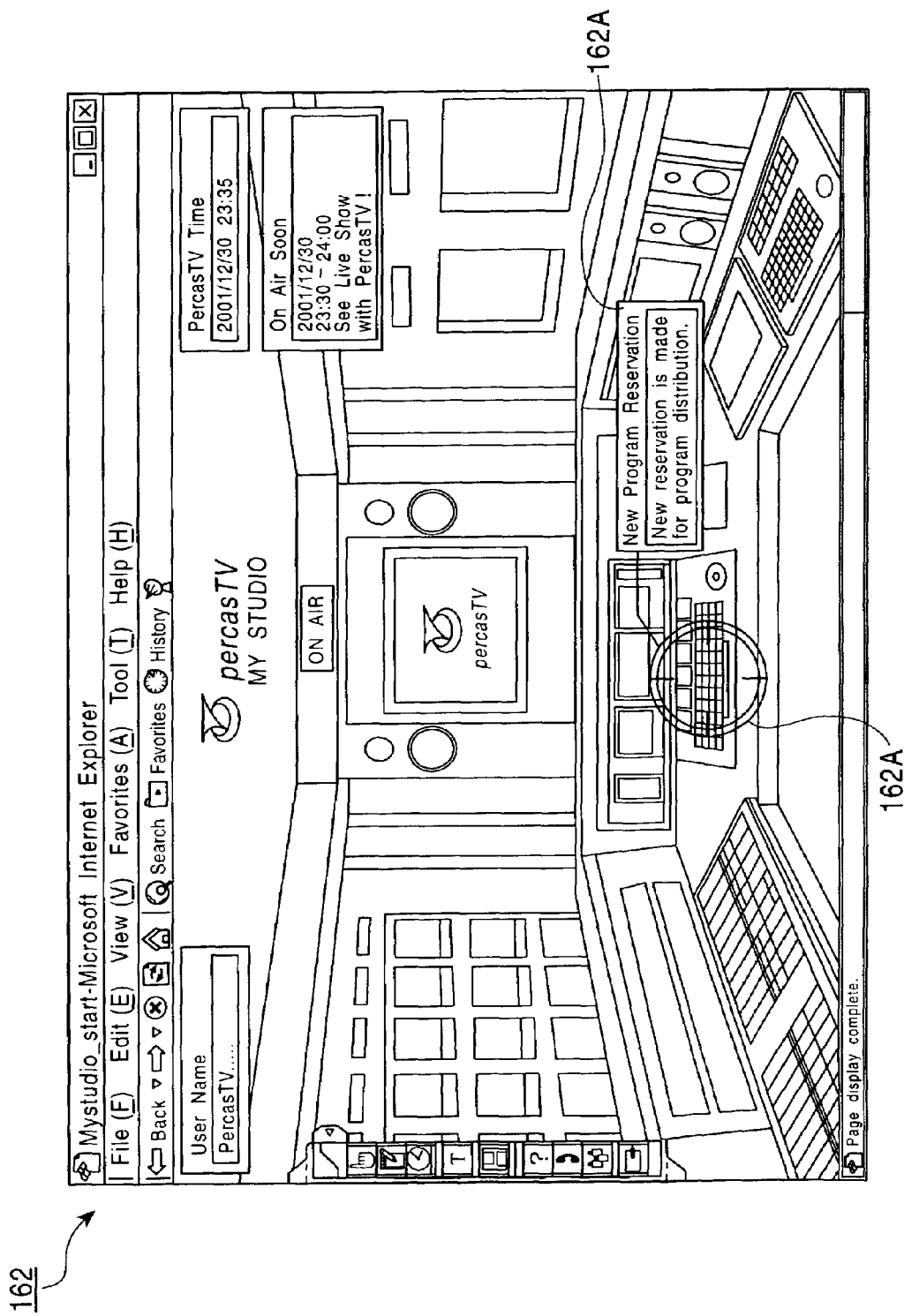
FIG. 16 illustrates a "my studio" start screen.

The reservation registration processing is discussed below with reference to the flowchart of FIG. 15. In step SP11, after the completion of the membership registration processing, the content provider inputs the user ID and the password in the log-in display column 161A of the "my studio" screen 161 (FIG. 13) as a registered member. When a power switch button 161D is clicked, the CPU 10 of the user PC 4 performs log-in processing for the live casting server 150 of the server-use reservation management center 5, and displays a "my studio" start screen 162, such as that shown in FIG. 16, based on the subsequent web page received from the live casting server 150.

The "my studio" start screen 162 is a simulated studio of a broadcast station, and a new program reservation button (indicated by the double circles in FIG. 16) 162A for making a new program reservation is disposed substantially at the center of the "my studio" start screen 162. When the new program reservation button 162A is clicked, the processing is shifted to the new program registration procedure.

Figure 17:
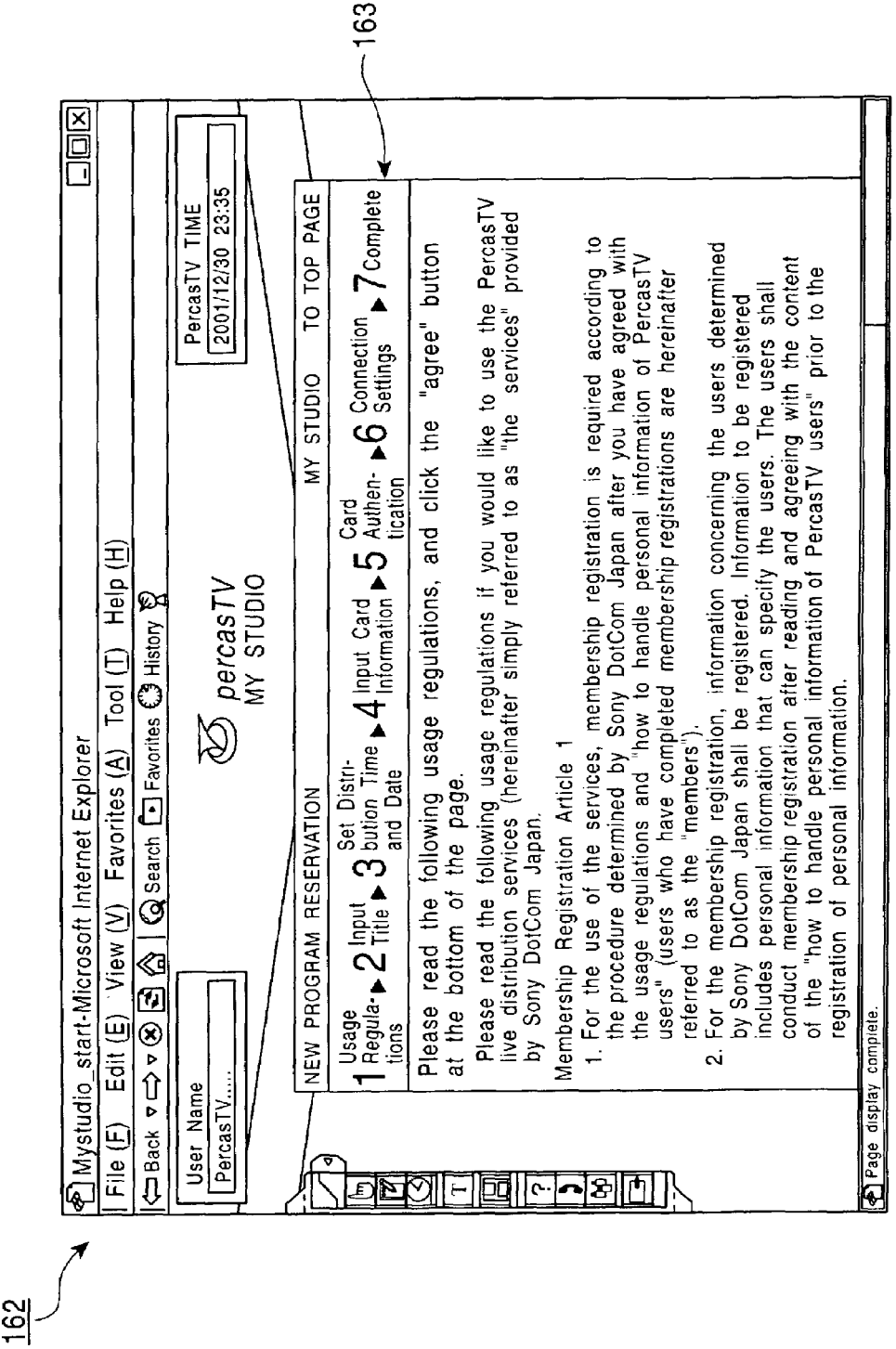
FIG. 17 illustrates a usage-regulation check screen.

When the new program reservation button 162A is clicked, the CPU 10 of the user PC 4 receives the subsequent web page from the live casting server 150, and displays a usage-regulation check screen 163, such as that shown in FIG. 17, based on the web page. The usage-regulation check screen 163 is displayed such that it is overlaid on the "my studio" start screen 162.

In this usage-regulation check screen 163, usage regulations for receiving the personal casting services and various regulations for membership registration are indicated. When an area in which "agree" is indicated (not shown) is clicked after the user checks the regulations, the CPU 10 of the user PC 4 requests the live casting server 150 to send the distribution reservation web page, and the process proceeds to step SP12.

In step SP12, upon receiving the request from the user PC 4, the live casting server 150 sends the distribution reservation web page to the user PC 4 via the Internet 2, and the process proceeds to step SP13.

Figure 18:
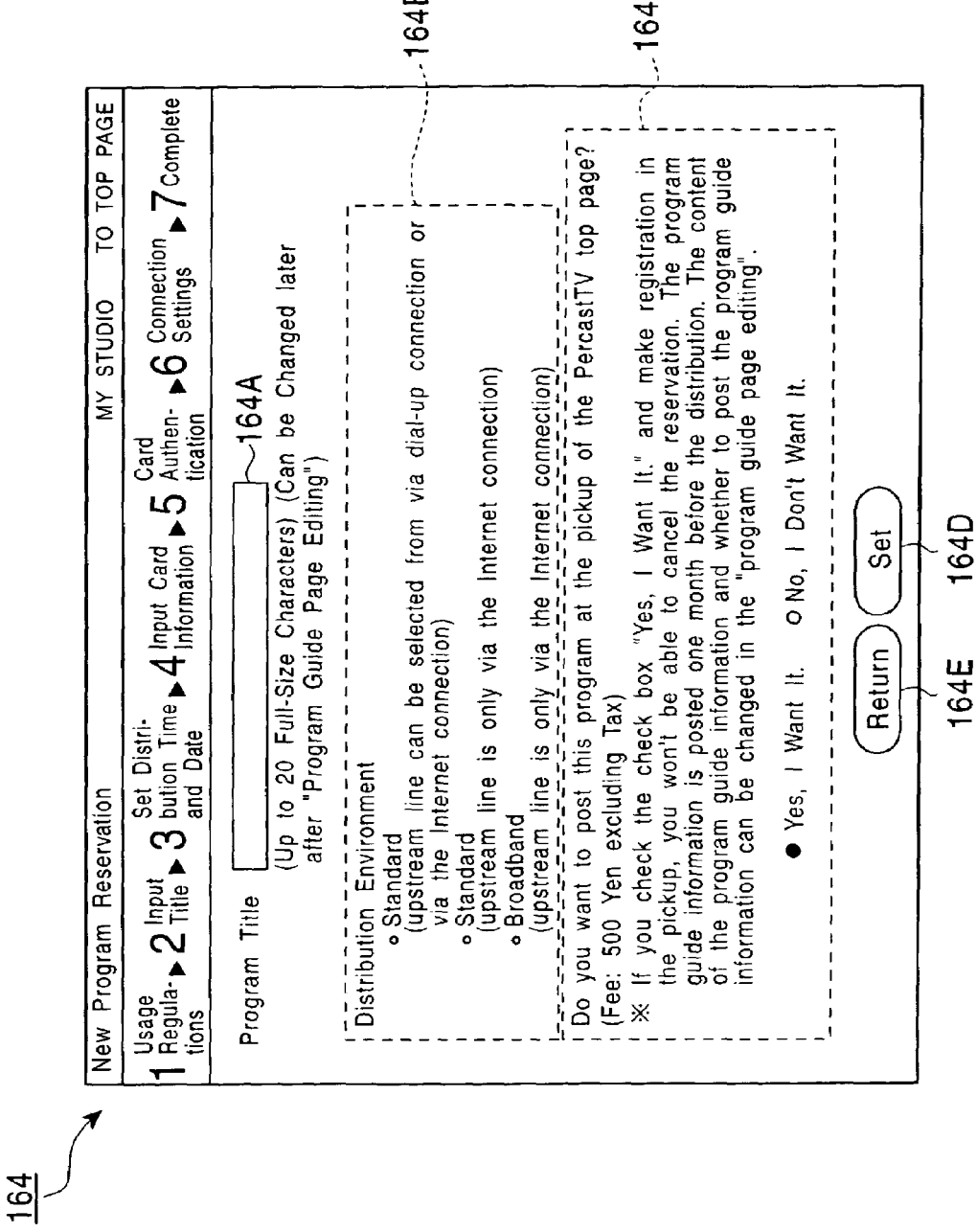
FIG. 18 illustrates a new program reservation screen.

In step SP13, the user PC 4 receives the distribution reservation web page from the live casting server 150, and displays a new program reservation screen 164, such as that shown in FIG. 18, instead of the usage-regulation check screen 163 based on the distribution reservation web page such that it is overlaid on the "my studio" start screen 162.

The new program reservation screen 164 is provided with a program title input column 164A in which the program title of the content to be distributed is input by the content provider, a distribution environment setting column 164B, and a program announcement setting column 164C for selecting whether the program guide information of the content is to be posted on the program guide display area 160A of the personal casting service top page 160.

The program title input in the program title input column 164A is posted on the program guide display area 160A of the personal casting service top page screen 160. The program title may be changed later in the program guide page editing screen by the content provider.

In the distribution environment setting column 164B, three check columns, i.e., "standard (upstream line can be selected via the dial-up connection or the Internet connection)", "standard (upstream line is only via the Internet connection)", and "broadband (upstream line is only via the Internet connection)", are provided. The user PC 4 is able to select the adaptable environment from these three types.

Figure 12:
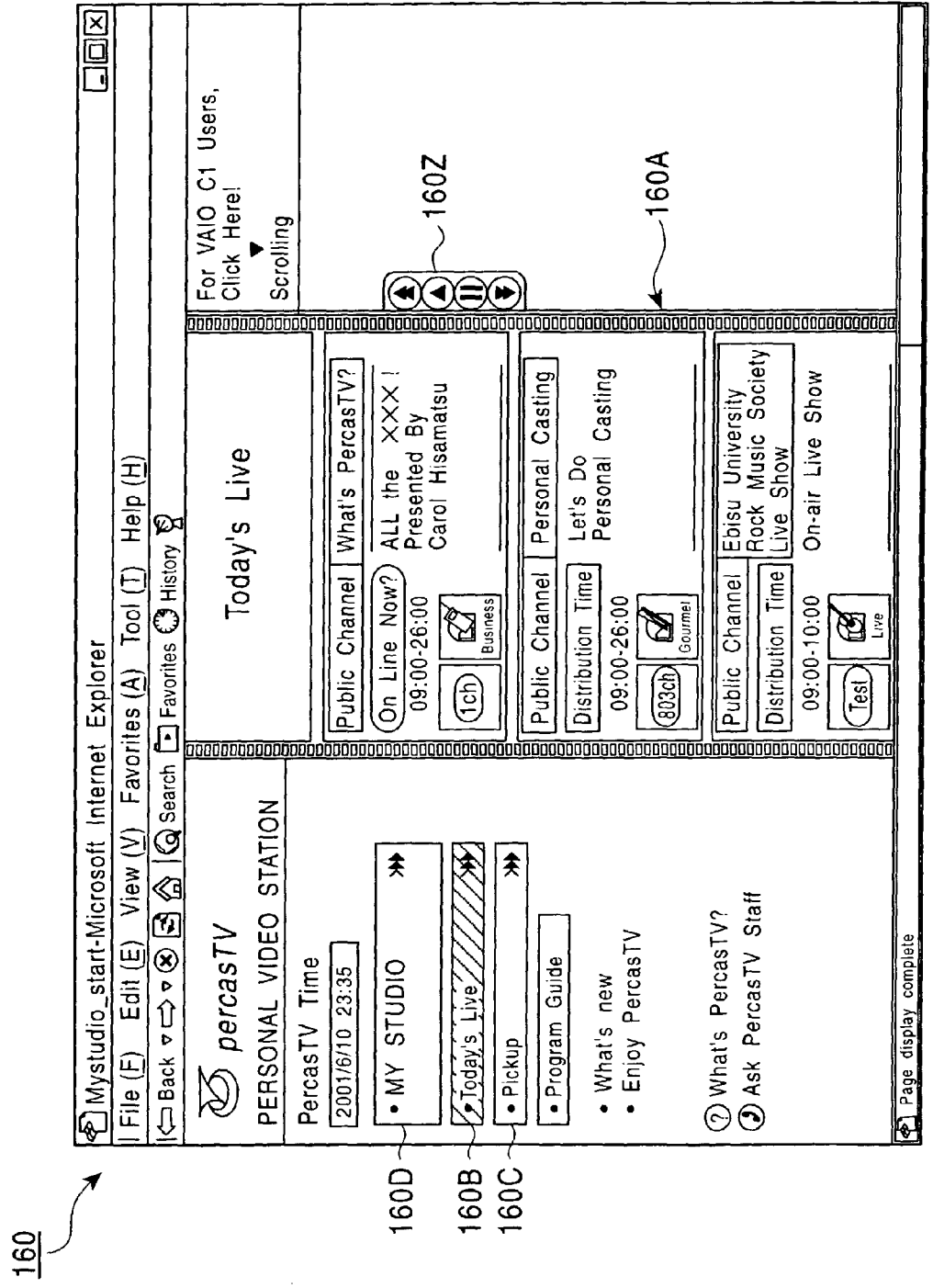
FIG. 12 illustrates a personal casting service top page screen.

In the program announcement setting column 164C, two types of check columns, i.e., "Yes, I Want it" and "No, I Don't Want it" are provided. If the check column "Yes, I Want it" is checked, the program guide information including the program title is posted in the program guide display area 160A for one month until the day when the program is distributed by clicking a "pickup" button 160C in the personal casting service top page screen 160 (FIG. 12).

However, even if the check column "No, I Don't Want it" is checked, the program guide information for the content to be distributed is posted in the program guide display area 160A on the day when the program is distributed if the "today's live" button 160B of the live casting service top page screen 160 is clicked.

Then, when a "set" button 164D is clicked after completing the new program reservation in the new program reservation screen 164, such as inputting the program title, selecting the distribution environment, and determining whether the program announcement is to be posted, the CPU 10 of the user PC 4 displays a broadcast time-and-date setting screen 165, such as that shown in FIG. 19, based on the subsequent web page received from the live casting server 150 such that it is overlaid on the "my studio" start screen 162.

When a "return" button 164E is clicked, the CPU 10 of the user PC 4 returns to the previous usage-regulation check screen 162 rather than proceeding to the broadcast time-and-date setting screen 165.

In the broadcast time-and-date setting screen 165, the day when the program is to be distributed can be selected from the time table (calendar). When the desired day is clicked in the calendar, it is automatically set in a distribution day input column 165A.

In the broadcast time-and-date setting screen 165, the distribution day in the distribution day input column 165A, the start time, the distribution time, and the distribution channel are input in a start time input column 165B, a distribution time input column 165C, and a distribution channel input column 165D, respectively. Then, a "set" button 165E is clicked. The CPU 10 of the user PC 4 then receives the subsequent web page from the live casting server 150, and displays a settlement screen 166, such as that shown in FIG. 20, such that it is overlaid on the "my studio" start screen 162.

In the settlement screen 166, "reserved day", "reserved time", "channel", "time", and "fee", which correspond to the "title" ("CONGRATULATION" in FIG. 20) input in the program title input column 164A of the new program reservation screen 164, are displayed in a reserved-content display column 166A. In a fee display column 166B, the total amount of the fee including the program fee, the pickup registration fee charged for the program announcement, and the predetermined discounts are displayed. The content provider is then able to check the reserved time slot and the fees.

In the settlement screen 166, the content provider is instructed to input credit card information in a credit card information input column 166C, and then to click a "set" button 166D or a "return" button 166E.

In step SP14, when the "set" button 166D in the settlement screen 166 is clicked, the CPU 10 of the user PC 4 creates the reservation information file based on the various items of information set in the new program reservation screen 164 (FIG. 18), the broadcast time-and-date setting screen 165 (FIG. 19), and the settlement screen 166 (FIG. 20), and sends the reservation information file to the live casting server 150 via the Internet 2. The process then proceeds to step SP15.

Then, the CPU 10 of the user PC 4 displays a settling screen 167, such as that shown in FIG. 21, so as to inform the content provider that authentication is currently being performed on the credit card information by the live casting server 150.

In step SP15, the live casting server 150 checks the content of the reservation information file received from the user PC 4, and determines whether the reservation is to be accepted. The process then proceeds to step SP16.

More specifically, in step SP15, the live casting server 150 checks whether the information input in the reservation information file is sufficient and whether the reserved time slot in the distribution channel is available, and also checks whether the corresponding content provider has not yet reserved frames exceeding a preset number of frames.

In the live casting services, the maximum number of frames that can be reserved (for example, 10 minutes for each frame) for one month is set for a content provider.

Accordingly, the live casting server 150 checks whether the number of frames which have been reserved by the content provider for the last month does not exceed the predetermined number of frames. If the content provider has reserved more than the predetermined number of frames, the live casting server 150 does not accept the reservation from this content provider.

If the number of frames which have been reserved for the last month does not exceed the predetermined number of frames, and if there is no problem for the other check items, the live casting server 150 determines that the reservation can be accepted.

Accordingly, in order to check the number of reserved frames by the live casting server 150, the reservation status for each content provider registered as a premium member is stored in the user database 152 at least for the previous month.

If the live reservation is accepted, in step SP16, the live casting server 150 creates the reservation ID used only for authentication when the reserved program is distributed, and writes the reserved content information including the reserved time slot, the distribution channel, the transmission band (bps), and the mail addresses of a friend list, the user ID for identifying the content provider, and the reservation ID into the reservation database 151 (FIG. 11), thereby performing the reservation registration. The process then proceeds to step SP17.

Simultaneously, if it has been set in the new program reservation screen 164 to post the content guide information in the program guide display area 160A of the live casting service top page screen 160, the live casting server 150 changes the billing flag information of the user database 152 to "billable", thereby performing billing processing.

In step SP17, by referring to the reservation database 151 and the user database 152, the live casting server 150 creates a reservation setting information file 184, such as that shown in FIG. 22, having the same content as the registered reservation. The process then proceeds to step SP18.

Then, the CPU 10 of the user PC 4 displays an automatic-setting screen 168, such as that shown in FIG. 23, for automatically setting the reservation setting information file, based on the subsequent web page received from the live casting server 150.

In the automatic-setting screen 168, the "distribution day", the "start time and end time", the "channel", and the "viewing password", which correspond to the "title" ("CONGRATULATION" in the example shown in FIG. 23) for checking the content of the reservation setting information file 184, are displayed in a reservation content display column 168A so that the content provider can confirm the content of the reservation setting information file 184. The password indicated in the "viewing password" is the distribution request password in the reservation setting information file 184.

When an automatic-setting button 168B is clicked after checking the reservation content display column 168A in the automatic-setting screen 168, the CPU 10 of the user PC 4 requests the live casting server 150 to send the reservation setting information file 184.

A "reservation file download" button 168C is also provided for the automatic-setting screen 168. With this button, even if the reservation setting information file 184 cannot be automatically installed by the basic program of the user PC 4, it can be formatted into a file that can be received by the user PC 4, and then, it can be downloaded by using the live casting server 150.

In step SP18, in response to the request from the user PC 4, the live casting server 150 encrypts the reservation setting information file 184 according to an encryption technique, such as the data encryption standard (DES), and sends the encrypted reservation setting information file 184 to the user PC 4. The process then proceeds to step SP19.

In step SP19, the CPU 10 of the user PC 4 receives the encrypted file from the live casting server 150, and decrypts the file by using a program, for example, "ActiveX", so as to read the reservation setting information file 184. The CPU 10 of the user PC 4 then automatically installs the reservation setting information file 184 into a predetermined storage area of the hard disk 13 according to the commands contained in the reservation setting information file 184, and the process then proceeds to step SP20.

In step SP20, after completing the automatic installation of the reservation setting information file 184, the CPU 10 of the user PC 4 displays a reservation completion screen 169, such as that shown in FIG. 24.

In the reservation completion screen 169, a message, such as "your reservation is completed", is displayed, and a reservation content report column 169A having the same information as the reservation content display column 168A of the automatic-setting screen 168 is also displayed. In this example shown in FIG. 24, the message, such as "only the time slot has been reserved", is displayed, and the content provider is instructed to proceed to the subsequent processing, i.e., the program guide page editing processing, so as to create and produce the program.

That is, at this stage, the reservation registering processing is provisionally completed. The CPU 10 of the user PC 4 is then able to perform stream distribution via the streaming server 8 when the distribution start time is reached.

In this case, since only the time slot is reserved, the content program guide information remains blank. However, although the reservation registering processing is incomplete, it is time-saving for the content providers who do not need to post the program guide information or for the content providers who do not have enough time until live distribution after conducting reservation registering.

In this reservation completion screen 169, when a "to program guide page editing" button 169B is clicked, the CPU 10 of the user PC 4 receives the subsequent web page from the live casting server 150, and displays an editing selection screen (not shown). The process then proceeds to step SP21.

In step SP21, when the reservation ID of the program to be edited is clicked by the content provider in the editing selection screen, the CPU 10 of the user PC 4 sends the clicked reservation ID to the live casting server 150 via the Internet 2.

Upon receiving the reservation ID from the user PC 4, the live casting server 150 sends the web page of the program guide page editing screen corresponding to the reservation ID to the user PC 4.

In step SP22, the CPU 10 of the user PC 4 displays the program guide page editing screen (not shown) based on the web page received from the live casting server 150, and performs editing processing on the program guide information, such as the program title, the sub title, the category, the program summary, the program detailed information, and the viewing password, according to the input operation of the content provider. Then, the CPU 10 of the user PC 4 returns the editing result data to the live casting server 150 via the Internet 2, and completes the reservation registering sequence.

Upon receiving the editing result data from the user PC 4, the live casting server 150 adds the editing result data to the reservation registration content in accordance with the reservation ID so as to update the reservation registration content, and also sends the web page indicating the updating result to the user PC 4.

Then, the CPU 10 of the user PC 4 displays an editing update screen (not shown) based on the web page received from the live casting server 150. The content provider is then informed that the editing processing for the program guide information is completed.

(2-3) Real-Time Distribution Reservation Registering

When the content provider performs a calling operation for the menu in the "my studio" screen 161 (FIG. 13), the CPU 10 of the user PC 4 makes a menu viewing request to the live casting server 150. The CPU 10 then receives the corresponding web page from the live casting server 150, and displays a "my studio" screen 191 on which the menu is indicated, such as that shown in FIG. 25, based on the received web page.

In the "my studio" screen 191, a menu 191A is displayed at the left side of the screen, and a "send immediately!" button 191B is disposed at the topmost portion of the menu 191A, and another "send immediately!" button 191C which indicates the area designated by the double circles disposed at the right side from the center portion of the screen is provided. By clicking the "send immediately!" button 191B or 191C, the content provider is able to make a reservation for immediately distributing the content.

Figure 26:
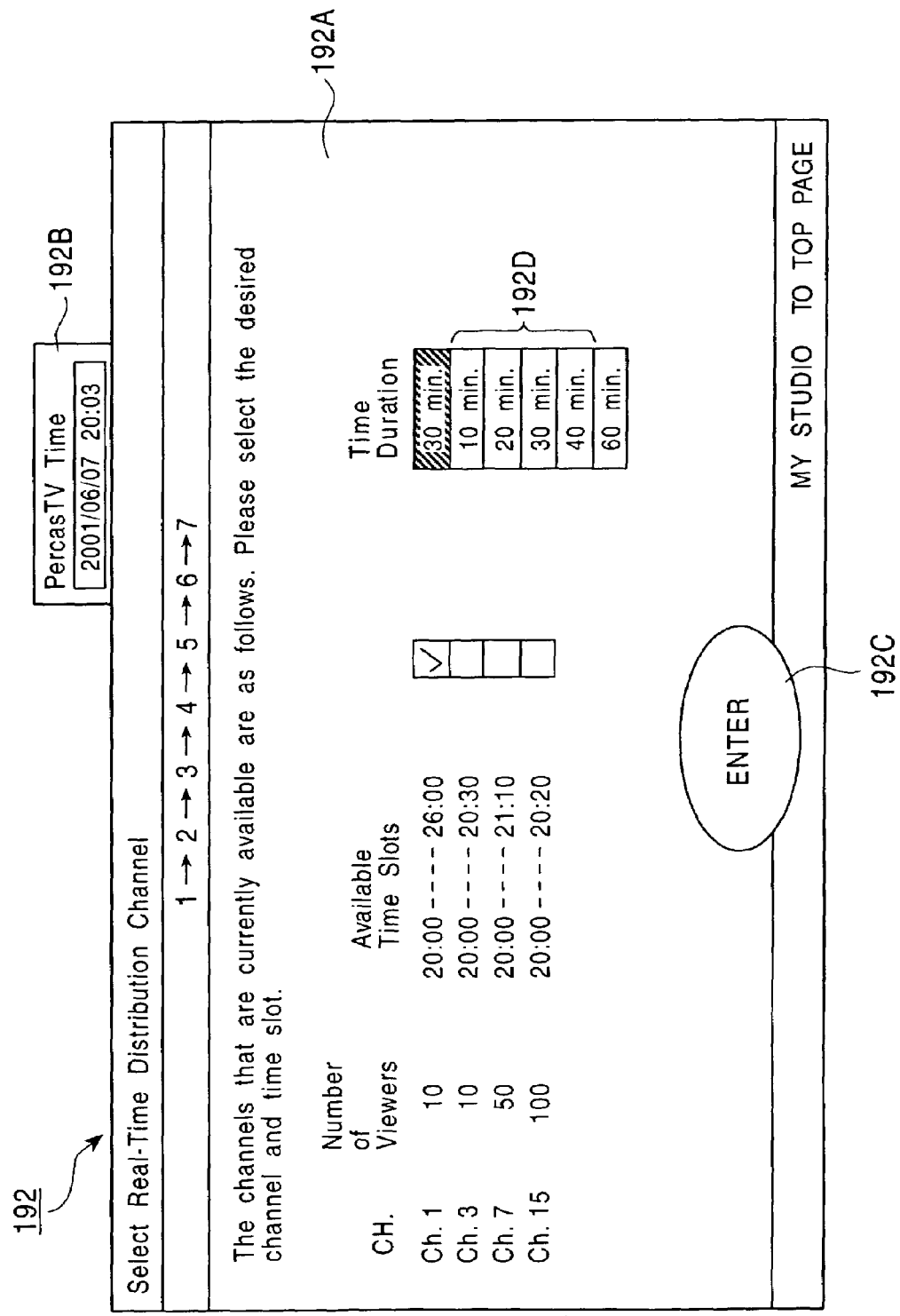
FIG. 26 illustrates a distribution channel selection screen for a real-time distribution reservation.

When the "send immediately!" button 191B or 191C is clicked, the CPU 10 of the user PC 4 receives the subsequent web page from the live casting server 150, and displays a distribution channel selection screen 192 for performing real-time distribution, such as that shown in FIG. 26, based on the received web page. The distribution channel selection screen 192 is displayed such that it is overlaid on the "my studio" screen 191.

The distribution channel selection screen 192 includes a reservation channel setting portion 192A for setting the distribution channel and the distribution time of the content to be immediately sent, and a time display portion 192B indicating the current time in the content distribution system 1.

In the reservation channel setting portion 192A, the currently available distribution channels and time slots are displayed. The content provider selects the distribution channel by checking in the check column of a desired distribution channel based on the maximum number of viewers to which the content can be distributed and the available time slots. The content provider also selects a desired distribution time duration from a pull-down menu 192D in the "distribution time duration" by checking the time display portion 192B.

In the content distribution system 1, the real-time distribution reservation can be made in units of ten minutes, and if the current time is 20:03 Mar. 29, 2001, the time slot from 20:00 to 20:30 in the distribution channel "1" with a time duration of 30 minutes is set as the desired distribution time, assuming that three minutes have already elapsed, and the distribution of the content is started immediately after the real-time distribution reservation is finished.

That is, in the content distribution system 1, the real-time distribution reservations are accepted in units of ten minutes by the live casting server 150, and billing processing is performed for the reservations in units of ten minutes. For example, the same fee is charged for the real-time distribution reservations which are made at 20:01 and at 20:09. With the reservation made at 20:01, the personal casting services can be used eight minutes longer.

In the live casting server 150, the real-time distribution reservations may be accepted, for example, in units of three minutes. As this time interval is shorter, the burden of fees on the content provider becomes smaller.

Figure 27:
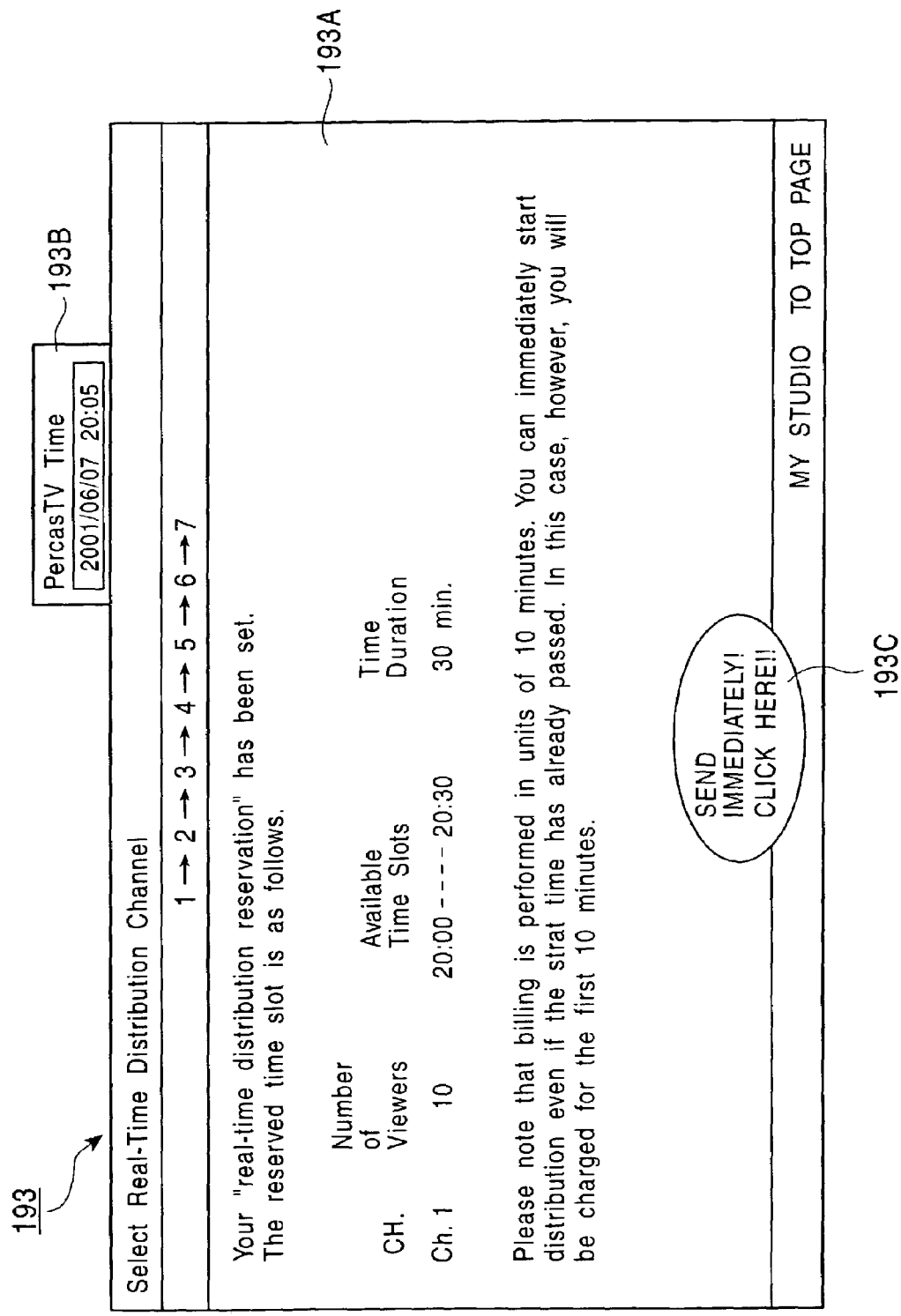
FIG. 27 illustrates a reservation confirmation screen.

When an enter button 192C is clicked after the distribution channel and the desired distribution time are set by the content provider, the CPU 10 of the user PC 4 receives the web page from the live casting server 150, and displays a reservation confirmation screen 193, such as that shown in FIG. 27, based on the received web page.

In the reservation confirmation screen 193, a reservation content display portion 193A and a time display portion 193B are provided. The reservation content display portion 193A indicates that, at the current time 20:03 indicated in the time display portion 193B, the time slot from 20:00 to 20:30 (30 minutes) in the distribution channel "1" (Ch "1") selected in the distribution channel selection screen 192 is set by the content provider. The reservation content display portion 193A also indicates that the content can be distributed immediately, i.e., from the current time (20:05), even though the start time 20:00 has already passed, in which case, however, the content provider is charged for the first ten minutes, which is the minimum billing unit.

In the reservation confirmation screen 193, when a "send immediately!" button 193C is clicked after the content provider agrees with the conditions indicated in the reservation content display portion 193A, the CPU 10 of the user PC 4 sends a real-time distribution reservation information file including the desired distribution channel and distribution time set in the distribution channel selection screen 192 (FIG. 26) to the live casting server 150.

The live casting server 150 receives the real-time distribution reservation information file from the user PC 4, and stores it in the reservation database 151. The live casting server 150 also sends reservation data concerning the real-time distribution reservation information file to the streaming server 8, and then sends the subsequent web page to the user PC 4.

Thus, the streaming server 8 completes the real-time distribution settings. Then, the content received from the user PC 4 can be sent immediately after completing the real-time distribution reservation.

Figure 28:
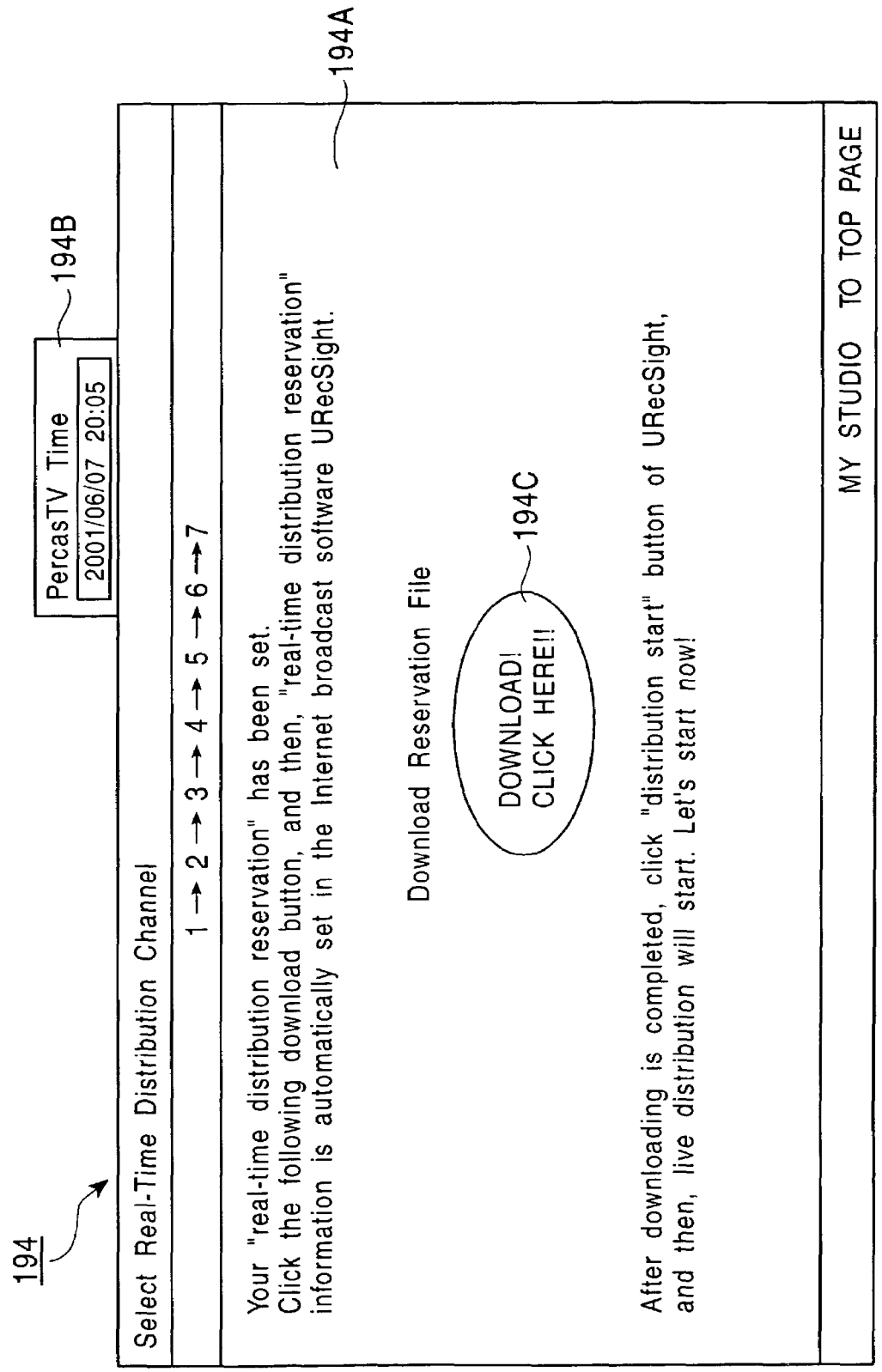
FIG. 28 illustrates a file download start screen.

The CPU 10 of the user PC 4 then displays a file download start screen 194, such as that shown in FIG. 28, based on the subsequent web page received from the live casting server 150.

The file download start screen 194 includes a file download display portion 194A and a time display portion 194B. The file download display portion 194A is provided with a download button 194C for allowing the user PC 4 to download and install the real-time distribution reservation setting information file including the content set in the distribution channel selection screen 192 (FIG. 26).

The real-time distribution reservation setting information file to be downloaded by the user PC 4 is slightly different from the reservation setting information file 184 (FIG. 22) created by the regular reservation registering sequence (FIG. 15). In the real-time distribution reservation setting information file, only minimum number of information required for implementing the real-time distribution is indicated. For example, the transmission band is preset, and the friend-list address information is excluded.

When the download button 194C is clicked in the file download screen 194, the CPU 10 of the user PC 4 receives from the live casting server 150 the real-time distribution reservation setting information file including the desired distribution channel and distribution time set in the distribution channel selection screen 192 (FIG. 26), and automatically stores the file in the hard disk 13.

Then, the CPU 10 of the user PC 4 shifts the screen from the initial screen 35 (FIG. 5) to the live distribution mode screen 54 (FIG. 10). When the "distribution start/end" button is selected with the focus F in the live distribution mode screen 54, the CPU 10 of the user PC 4 immediately starts to send the content which is currently being captured by the user PC 4 to the streaming server 8 according to the real-time distribution reservation setting information file.

Figure 25:
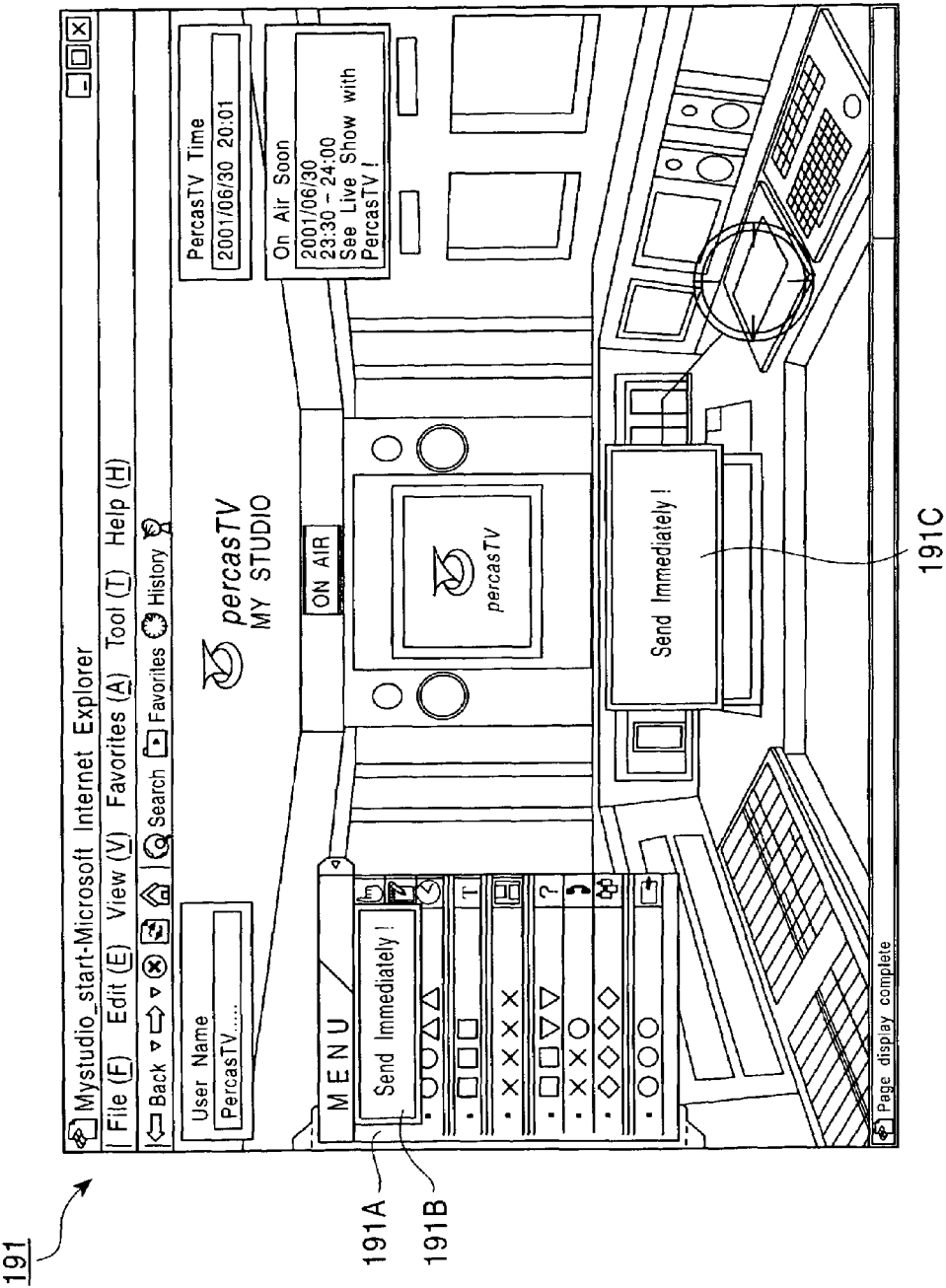
FIG. 25 illustrates a "my studio" screen including a menu.

The real-time distribution registering sequence performed in the content distribution system 1 is discussed below with reference to FIGS. 29 and 30. In FIG. 30, in step SP51, the CPU 10 of the user PC 4 makes a real-time distribution reservation request to the live casting server 150 by clicking the "send immediately!" button 191B or 191C in the "my studio" screen 191 (FIG. 25). The process then proceeds to step SP52.

In step SP52, the live casting server 150 sends the web page to the user PC 4 in response to the real-time distribution reservation request. The process then proceeds to step SP53.

In step SP53, the CPU 10 of the user PC 4 displays the distribution channel selection screen 192 based on the received web page, and the content provider selects the desired distribution channel and distribution time. When the enter button 193C in the reservation confirmation screen 193 (FIG. 27) is clicked, the CPU 10 of the user PC 4 creates the real-time distribution reservation information file and sends it to the live casting server 150. The process then proceeds to step SP54.

In step SP54, upon receiving the real-time distribution reservation information file from the user PC 4, the live casting server 150 stores it in the reservation database 151, and then sends the subsequent web page to the user PC 4. The process then proceeds to step SP55.

In step SP55, when the download button 194C is clicked in the file download start screen 194 (FIG. 28), the CPU 10 of the user PC 4 makes a request to download the real-time distribution reservation setting information file to the live casting server 150. The process then proceeds to step SP56.

In step SP56, in response to the download request from the user PC 4, the live casting server 150 sends the real-time distribution reservation setting information file, and the process then proceeds to step SP57.

In step SP57, the live casting server 150 sends the reservation data indicating the content of the real-time distribution reservation setting information file to the streaming server 8, and the process then proceeds to step SP58.

In step SP58, the CPU 10 of the user PC 4 stores the real-time distribution reservation setting information file in the hard disk 13, and then performs real-time distribution processing according to the real-time distribution reservation setting information file.

In step SP59, almost simultaneously with the processing in step SP58, the streaming server 8 checks the content of the reservation data received from the live casting server 150, and performs settings to receive the content according to the real-time distribution. Then, the process proceeds to step SP60.

In step SP60, the CPU 10 of the user PC 4 shifts to the live distribution mode screen 54 (FIG. 10) according to the operation of the content provider, and determines whether a content distribution command has been issued by checking whether the "start/end distribution" button is clicked in the live distribution mode screen 54.

If it is found in step SP60 that the content distribution command has not been issued, the CPU 10 of the user PC 4 waits until the "start/end distribution" button is clicked.

In contrast, if it is found in step SP60 that the content distribution command has been issued, the CPU 10 of the user PC 4 proceeds to step SP61.

In step SP61, the CPU 10 of the user PC 4 immediately sends the content that is currently being captured by the user PC 4 to the streaming server 8 according to the distribution command, and the process proceeds to step SP62.

In step SP62, the streaming server 8 distributes in real time the content received from the CPU 10 of the user PC 4 to the client PCs 7A, 7B, and 7C via the Internet 2, and the real-time distribution reservation registering sequence is completed.

When starting live distribution as discussed above, the streaming server 8 sends the time information managed by the service providers acquired from the NTP server 153 and the number-of-viewer information indicating the number of client PCs 7A, 7B, and 7C that are receiving live distribution to the user PC 4.

In addition to the time information managed by the service providers and the number-of-viewer information received from the streaming server 8, the CPU 10 of the user PC 4 displays various items of information, such as the on-air information indicating that live distribution is currently being performed, the time information indicating the lapse of time after the start of distribution, the time information managed by the user PC 4, the reservation start time information, the reservation end time information, the distribution-remaining-time information, the image size information, and the transmission rate information, in the status window 103 of the live distribution mode screen 54 (FIG. 10).

The content provider is able to obtain various items of information concerning the live distribution that is currently being performed by checking the status window 103. In particular, the content provider is able to identify the precise viewer rate indicating the number of viewers receiving this live distribution. Then, the content provider can use the viewer rate as a future reference for selecting the channel for the subsequent live distribution (selecting the number of viewers).

The transmission of the content from the user PC 4 to the streaming server 8 is completed before the reservation end time is reached. Then, the streaming server 8 completes the real-time distribution processing for the client PCs 7A, 7B, and 7C and disconnects the communication with the user PC 4.

(3) Operation and Advantages

According to the above-described configuration, even if a reservation registration for performing content distribution has not been made via the streaming server 8, the CPU 10 of the user PC 4 is able to make a real-time distribution reservation request to the live casting server 150 of the server-use reservation management center 5.

In this case, the content provider simply sets the desired distribution channel and distribution time by checking the current time in the distribution channel selection screen 192 (FIG. 26) without the need to input the time and date of the scheduled broadcast, which is required for regular reservation registering. Thus, only the simple reservation registering is required without the need to perform detailed operations, thereby significantly reducing erroneous operations.

Then, upon completing the real-time distribution reservation registering, the CPU 10 of the user PC 4 is able to send the content any time within the selected distribution time in the selected distribution channel.

That is, in the content distribution system 1, even if regular reservation registering is not performed in advance, the real-time distribution reservation can be performed in units of ten minutes, and the content can be sent any time within the selected distribution time.

Accordingly, in the content distribution system 1, the content provider is able to easily make a real-time distribution reservation and to start distributing the content in real time by performing simple operations, such as selecting the desired channel and distribution time. Thus, the content provider is able to perform registration and distribution without the time constraints.

In the content distribution system 1 using both regular reservation registering and real-time distribution registering, unoccupied channels can be effectively utilized by the real-time distribution reservations, thereby significantly improving the operating rate as the entire system.

Accordingly, in the content distribution system 1 configured as described above, the content provider is able to make a real-time distribution reservation by using the user PC 4 simply by setting a desired distribution channel and time. Then, the content can be sent immediately even without a regular reservation.

(4) Modifications

In the above-described embodiment, the user PC 4, which serves as a user terminal, performs the real-time distribution reservation registering by using the "my studio" screen 191, the distribution channel selection screen 192, the reservation confirmation screen 193, and the file download start screen 194 based on the web pages received from the live casting server 150, which serves as a content reservation management apparatus. Alternatively, the above-described screens may be displayed according to application programs stored in the user PC 4, and, the real-time distribution reservation request can be made to the live casting server 150.

In the above-described embodiment, the desired distribution channel and distribution time are set in the distribution channel selection screen 192 by the content provider. Alternatively, an available channel may be automatically set and a distribution time may be automatically set as a default simply by clicking the "send immediately!" button 191B or 191C. In this case, it takes less time to complete the real-time distribution registering procedure, and thus, the time required for distributing the content is decreased, thereby improving the ease of operation.

Also, in the above-described embodiment, real-time distribution is performed on the live content. However, the content recorded in the user PC 4, which serves as a user terminal, in advance may be distributed in real time.

In the aforementioned embodiment, various programs, such as a program for performing regular reservations, a program for restricting various operations to be performed by the user PC 4 by automatically generating the reservation setting information file 184 and sending it to the user PC 4, and a program for performing real-time distribution reservations, are preinstalled in the hard disk of the live casting server 150. Also, various programs for executing processing when live reservations are made and when live distribution is performed are preinstalled in the hard disk 13 of the user PC 4. Alternatively, in the present invention, the above-described application programs may be stored in a program storage medium, that is, a package medium, such as a compact disc read only memory (CD-ROM) or a digital versatile disc read only memory (DVD-ROM), and the programs can be installed into the hard disk of the live casting server 150 or the hard disk 13 of the user PC 4 by reading the programs from the program storage medium. Alternatively, the various application programs may be temporally or permanently installed in a program storage medium, such as a semiconductor memory or a magneto-optical disk, and the programs can be installed into the hard disk of the live casting server 150 or the hard disk 13 of the user PC 4 by reading the programs from the program storage medium.

The application programs may be stored in the above-described program storage media by using a cable or wireless communication medium, such as a local area network (LAN) or a digital satellite broadcast. In this case, various communication interfaces, such as a router or a modem, may be used.

In the aforementioned embodiment, the Internet 2 is used for performing the real-time distribution reservation registering between the user PC 4 and the live casting server 150. However, another type of cable or wireless network may be used.

Moreover, in the above-described embodiment, the user PC 4 integrating the digital video camera 19 therein is used as a broadcaster terminal for performing real-time distribution. However, a regular PC to which a digital video camera is connected wirelessly or is connected by a cable via an IEEE-1394 interface may be employed. Alternatively, a cellular telephone to which a digital camera is connected by a cable or a cellular telephone integrating a digital camera therein may be used instead of the user PC 4.

A cellular telephone integrating a digital camera therein is described below as a modification made to the above-described embodiment.

Figure 31:
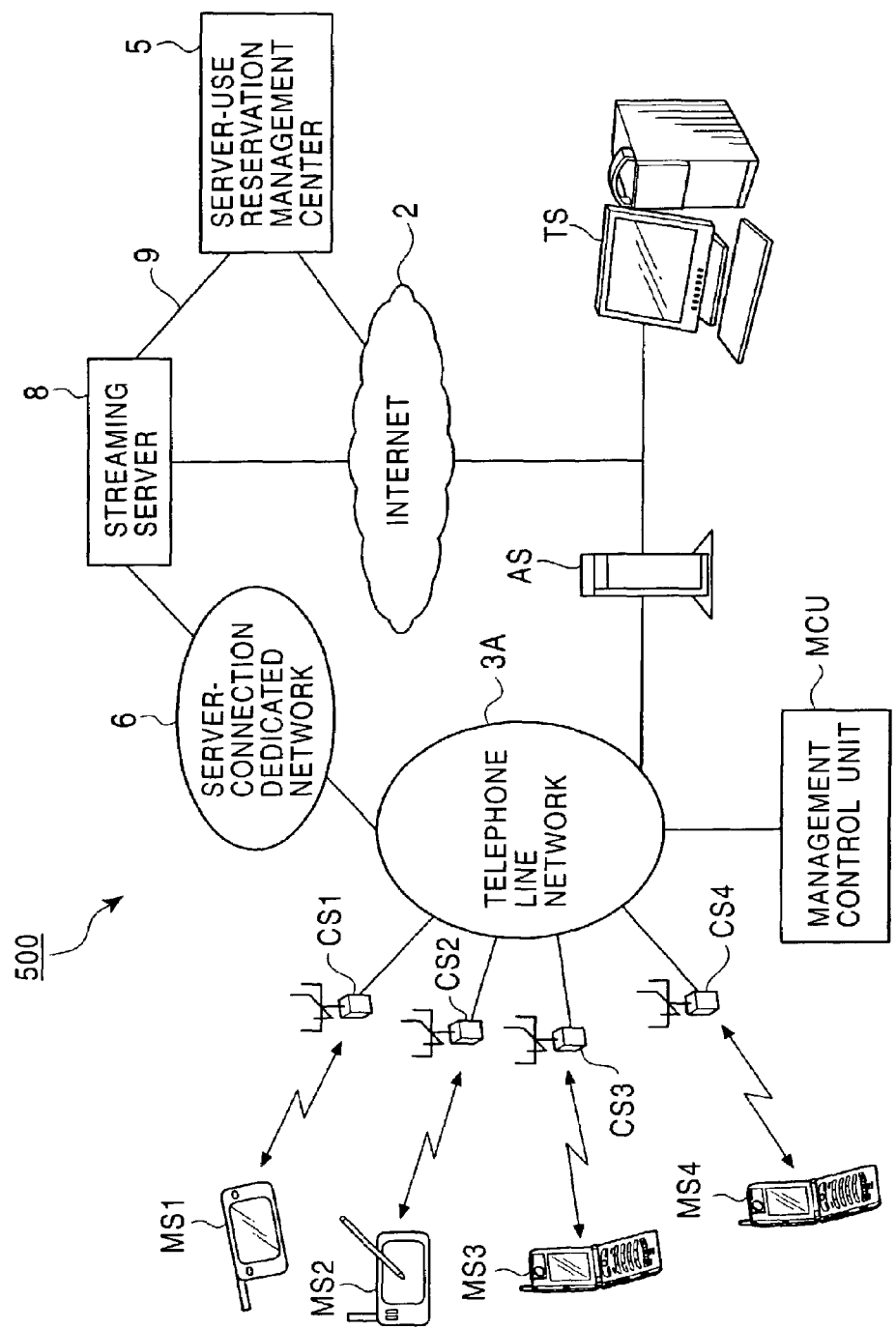
FIG. 31 is a schematic diagram illustrating a modification of the content distribution system.

As shown in FIG. 31, a cellular telephone MS3 to which the present invention is applied is connected to a content distribution system 500. Base stations CS1 through CS4, which serve as fixed wireless stations, are disposed in corresponding cells, which are formed by dividing a communication service providing area into a desired size.

In this content distribution system 500, personal digital assistants (PDAs) MS1 and MS2, which serve as mobile wireless stations, and cellular telephones MS3 and MS4 provided with a digital camera are wirelessly connected to the base stations CS1 through CS4, respectively, according to a code division multiple access method, for example, a wide-band-code division multiple access (W-CDMA) method. With this arrangement, fast data communication can be achieved in the content distribution system 500, for example, large-capacity data can be sent and received at a maximum data transfer rate of 2 Mbps by using a frequency range of 2 GHz.

In the PDAs MS1 and MS2 and the cellular telephones MS3 and MS 4, since fast data communication is implemented according to the W-CDMA method, a wide range of data communication including not only audio communication, but also the sending and receiving of e-mail, the viewing of simplified homepages, sending and receiving images, etc., can be achieved.

The base stations CS1 through CS4 are connected to the telephone line network 3A via a cable, and the Internet 2, many subscriber line terminals, computer networks, intranets, and so on (not shown), are connected to the telephone line network 3A.

An access server AV of an Internet service provider is also connected to the telephone line network 3A, and a content server TS possessed by the Internet service provider is connected to the access server AV.

In response to a request from a subscriber line terminal, the PDA MS1 or MS2, or the cellular telephone MS3 or MS4, the content server TS provides the content, such as simplified homepages, in, for example, a compact hyper text markup language (HTML) format file.

The compact HTML is a subset of the HTML, which is suitable for a limited-size display device, and corresponding tags are reserved and other portions are discarded. For example, in iMode (trade name) provided by NTT Docomo Inc. the iMode-compatible HTML is employed. In the iMode-compatible HTML, about 30 types of tags having functions only required for cellular telephones are used, and various restrictions are imposed, for example, character attributes and colors cannot be specified for text, and the two-level adjusting Graphics Interchange Format (GIF) file is recommended for images.

By using such a compact HTML, or a handheld device markup language (HDML) or a wireless markup language (WML), which is a description language used in a wireless application protocol (WAP), a simplified homepage file to be viewed by a cellular telephone, which has a limiting display area and display capacity, can be created.

As in the above-described embodiment, in the content distribution system 500, the server-use reservation management center 5 and the streaming server 8 are connected to the Internet 2 so that the subscriber line terminals, the PDAs MS1 and MS2, and the cellular telephones MS3 and MS4 can access the server-use reservation management center 5 and the streaming server 8 according to a transmission control protocol/internet protocol (TCP/IP).

As in the above-described embodiment, in the content distribution system 500, when performing streaming distribution via the streaming server 8, the content is sent from the cellular telephone MS3 or MS4 to the streaming server 8 via the server-connection dedicated network 6. However, the content may be sent via the Internet 2.

Communication is performed in the paths from the PDAs MS1 and MS2 and the cellular telephones MS3 and MS4 to the base stations CS1 through CS4 according to a simplified transport protocol at 2 Mbps, and communication is performed in the paths from the base stations CS1 through CS4 to the streaming server 8 via the Internet 2 according to the TCP/IP.

A management control unit (MCU) is connected to the subscriber line terminals, the PDAs MS1 and MS2 and the cellular telephones MS3 and MS4 via the telephone line network 3A, and performs authentication processing and billing processing for the subscriber line terminals, the PDAs MS1 and MS2 and the cellular telephones MS3 and MS4.

An example of the external configuration of the cellular telephone MS3, which is substituted for the user PC 4 (FIG. 1), is described below with reference to FIGS. 32 and 33.

Figure 32:
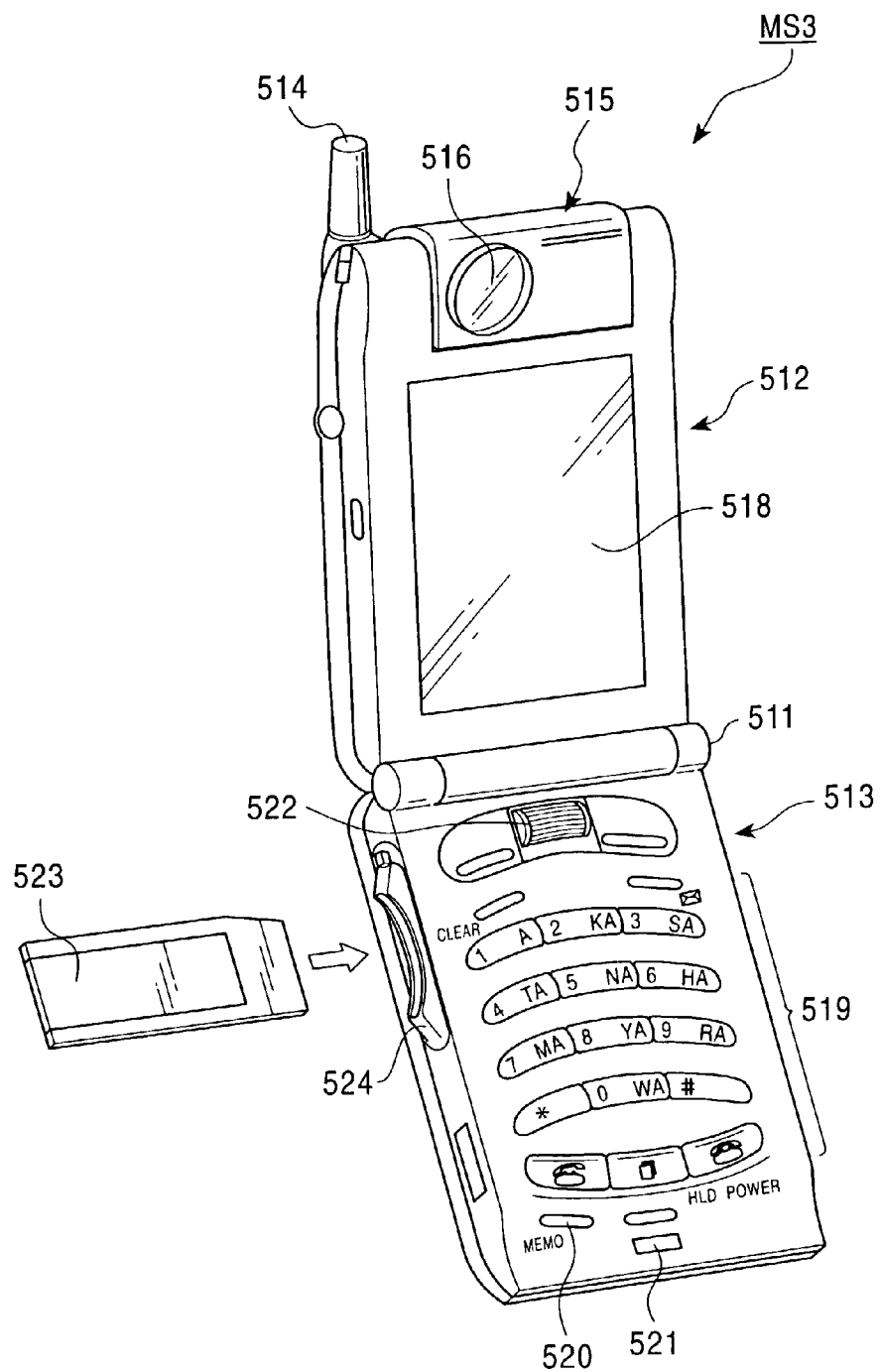
FIG. 32 is a perspective view schematically illustrating the external configuration of a cellular telephone provided with a digital camera.

As shown in FIG. 32, the cellular telephone MS3 is formed by connecting a display unit 512 and a main unit 513 via a hinge 511. The cellular telephone MS3 is foldable via the hinge 511.

A transmitting/receiving antenna 514 is attached to the top left portion of the display unit 512 such that it can be pulled and retracted from and into the display unit 512. The cellular telephone MS3 can transmit and receive radio waves to and from the base station CS3 via the antenna 514.

A camera portion 515 is disposed at the upper central portion of the display unit 512 such that it is rotatable about 180 degrees. A desired subject can be captured by using a charge coupled device (CCD) camera 516 of the camera portion 515.

Figure 33:
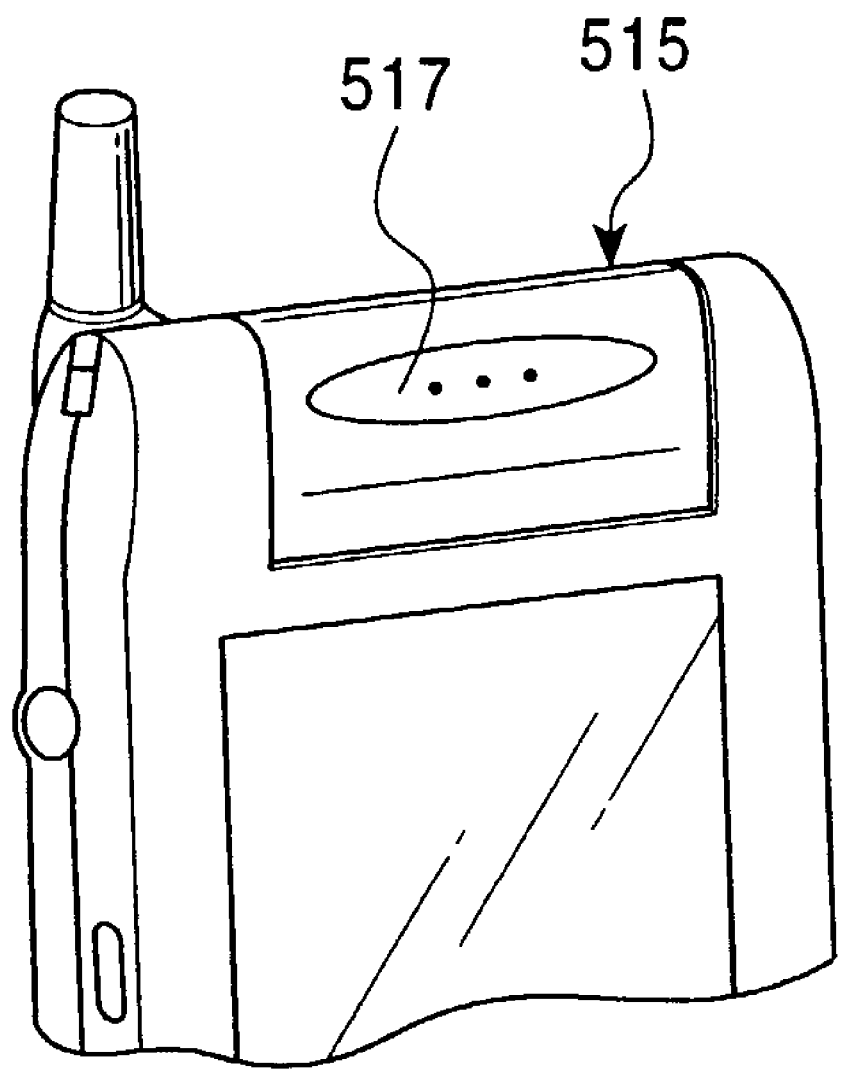
FIG. 33 is a perspective view schematically illustrating a display unit of the cellular telephone shown in FIG. 32 when a camera portion is rotated.

When the camera portion 515 is rotated about 180 degrees by the content provider, a speaker 517 disposed at the back center of the camera portion 515 is positioned at the front side, as shown in FIG. 33. Then, the cellular telephone MS3 enters the regular audio communication mode.

A liquid crystal display 518 is provided at the front of the display unit 512. On the liquid crystal display 518, not only the radio reception status, the remaining amount of battery, the names and the addresses registered in the address book, and the history, but also e-mail messages, simplified homepages, images captured by the CCD camera 516 of the camera portion 515, and television programs received via a built-in antenna (not shown) are displayed.

The main unit 513 is provided with operation keys 519, such as numeric keys from "0" to "9", a calling key, a redial key, a hang-up/power key, a clear key, and an e-mail key, and various instructions can be input by using the operation keys 519.

The main unit 513 is also provided with a memo button 520 and a microphone 521 below the operation keys 519. User voice can be recorded while talking by pressing the memo button 520, and user voice can be collected by the microphone 521.

A rotatable and pressable jog dial 522 is provided above the operation keys 519 of the main unit 513 such that it is slightly projected from the surface of the main unit 513. According to the rotation of the jog dial 522, the telephone list or an e-mail message displayed on the liquid crystal display 518 can be scrolled, a simplified homepage is scrolled, and an image can be sent.

For example, in the main unit 513, a desired telephone number is selected from a plurality of telephone numbers displayed on the liquid crystal display 518 according to the rotating operation performed on the jog dial 522 by the content provider. When the jog dial 522 is pressed toward the inward of the main unit 513, the selected telephone number is set, and the telephone number is automatically called.

A battery pack (not shown) is attached to the rear side of the main unit 513, and when the hang-up/power key is turned on, power is supplied from the battery pack to the individual circuits, and the cellular telephone MS3 becomes operable.

A memory stick slot 524 into and from which a memory stick (trade name of Sony Corporation) 523 can be inserted and removed is provided at the top left side of the main unit 513. By pressing the memory button 520, the user is able to record the voice of another person while talking to him/her, TV program video data which is currently being received, or e-mail, simplified homepages, and images captured by the CCD camera 516 can be recorded into the memory stick 523 according to the operation of the content provider.

The memory stick 523 is one type of flash memory card developed by Sony Corporation, which is the assignee to the present application. In the memory stick 523, a flash memory device, which is one type of electrically erasable and programmable read only memory (EEPROM), which is a non-volatile memory, is stored in a small and thin plastic casing having a length of 50 mm, a width of 21.5 mm, and a thickness of 8 mm. Various types of data, such as images, voice, and music, can be read and written from and into the memory stick 523 via ten pin terminals.

In the memory stick 523, a unique serial protocol is used for ensuring the compatibility between the machines in case of a change in the specifications of the built-in flash memory for increasing the capacity. High-speed performance having a maximum writing speed of 1.5 MB/S and a maximum reading speed of 2.45 MB/S can be implemented, and high reliability can be ensured by providing a switch for preventing data from being erroneously erased.

Accordingly, by the provision of the memory stick 523 for the cellular telephone MS3, the cellular telephone MS3 is able to share the same data with other electronic devices via the memory stick 523.

Figure 34:
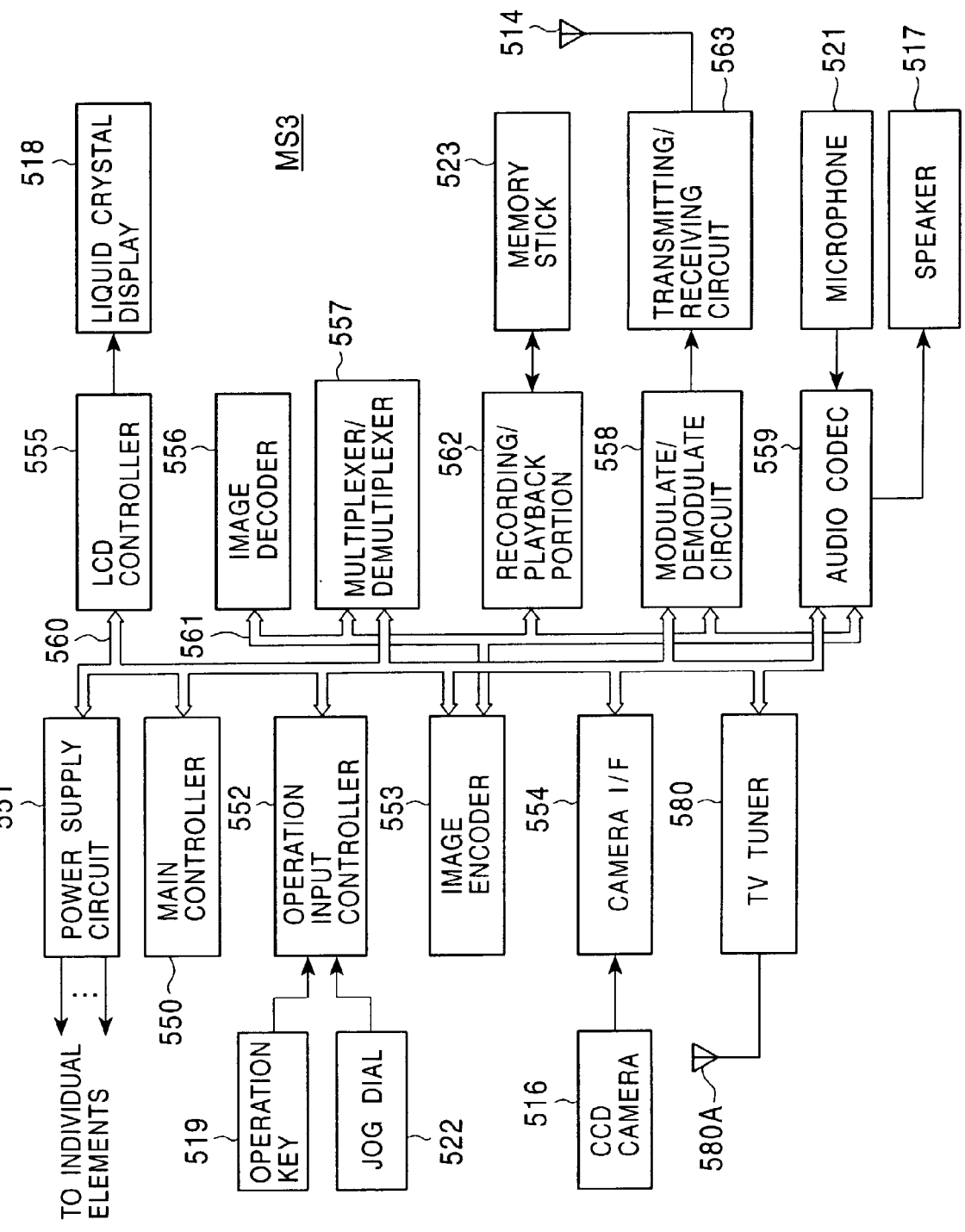
FIG. 34 is a block diagram illustrating the circuit configuration of the cellular telephone shown in FIG. 32.

FIG. 34 illustrates the circuit configuration of the cellular telephone MS3. In the cellular telephone MS3, as shown in FIG. 34, a power supply circuit 551, an operation input controller 552, an image encoder 553, a camera interface 554, a liquid crystal display (LCD) controller 555, an image decoder 556, a multiplexer/demultiplexer 557, a recording/playback portion 562, and a modulate/demodulate circuit 558, an audio codec 559 are connected via a main bus 560 to a main controller 550 which centrally controls the individual elements of the display unit 512 and the main unit 513. The image encoder 553, the image decoder 556, the multiplexer/demultiplexer 557, the modulate/demodulate circuit 558, and the audio codec 559 are connected to each other via a synchronizing bus 561.

When the hang-up/power key is turned on by the content provider, the power supply circuit 551 supplies power to the individual elements from the battery back, so that the cellular telephone MS 3 becomes operable.

In the cellular telephone MS3, under the control of the main controller 550 formed of a CPU, a ROM, a RAM, etc., an audio signal collected from the microphone 521 in the audio communication mode is converted into digital audio data by the audio codec 559. The digital audio data then undergoes spread spectrum processing in the modulate/demodulate circuit 558, and further undergoes digital-to-analog (D/A) conversion and frequency conversion processing in a transmitting/receiving circuit 563. The digital audio data is then transmitted via the antenna 514.

In the cellular telephone MS3, a signal received via the antenna 514 in the audio communication mode is amplified and undergoes frequency conversion and analog-to-digital (A/D) conversion processing. The digital data then undergoes de-spread spectrum processing in the modulate/demodulate circuit 558, and is converted into an analog audio signal in the audio codec 559. The analog audio signal is then output via the speaker 517.

In the cellular telephone MS3, when sending e-mail in the data communication mode, e-mail text data input by the operation of the operation keys 519 or the jog dial 522 is sent to the main controller 550 via the operation input controller 552.

The main controller 550 then controls the modulate/demodulate circuit 558 to perform spread spectrum processing on the text data, and controls the transmitting/receiving circuit 563 to perform D/A conversion and frequency conversion processing on the text data. The text data is then transmitted to the base station CS3 (FIG. 31) via the antenna 514.

When receiving e-mail in the data communication mode, a signal received from the base station CS3 via the antenna 514 undergoes de-spread spectrum processing in the modulate/demodulate circuit 558 so as to be reproduced into the original text data. The text data is then displayed on the liquid crystal display 518 as an e-mail message via the LCD controller 555.

Then, in the cellular telephone MS3, the received e-mail may be recorded in the memory stick 523 via the recording/playback portion 562 according to the operation of the content provider.

When sending image data in the data communication mode, image data captured by the CCD camera 516 is supplied to the image encoder 553 via the camera interface 554.

When the image data captured by the CCD camera 516 is not transmitted, it can be directly displayed on the liquid crystal display 518 via the camera interface 554 and the LCD controller 555.

The image encoder 553 compresses the image data supplied from the CCD camera 516 according to a predetermined coding method, such as MPEG2 or MPEG4 so as to convert the image data to encoded image data, and supplies it to the multiplexer/demultiplexer 557.

Meanwhile, the sound collected by the microphone 521 while the image is being captured by the CCD camera 516 is sent to the multiplexer/demultiplexer 557 via the audio codec 559 as digital audio data.

The multiplexer/demultiplexer 557 multiplexes the encoded image data supplied from the image encoder 553 with the audio data supplied from the audio codec 559 according to a predetermined method. The modulate/demodulate circuit 558 then performs spread spectrum processing on the resulting multiplexed data, and the transmitting/receiving circuit 563 performs D/A conversion and frequency conversion on the data. The data is then sent via the antenna 514.

When receiving data of a moving picture file linked to, for example, a simplified homepage, in the data communication mode, the modulate/demodulate circuit 558 performs spread spectrum processing on a signal received from the base station CS3 via the antenna 514, and supplies the resulting multiplexed data to the multiplexer/demultiplexer 557.

The multiplexer/demultiplexer 557 demultiplexes the multiplexed data into the encoded image data and the audio data. The multiplexer/demultiplexer 557 then supplies the encoded image data to the image decoder 556 and the audio data to the audio codec 559 via the synchronizing bus 561.

The image decoder 556 decodes the encoded image data according to a decoding method corresponding to the predetermined encoding method, such as MPEG2 or MPEG4, so as to generate a reproduced moving picture data, and supplies the data to the liquid crystal display 518 via the LCD controller 555. Then, the moving picture data contained in the moving picture file linked to, for example, a simplified homepage, can be displayed.

Meanwhile, the audio codec 559 converts the audio data into an analog audio signal, and supplies it to the speaker 517. Then, the audio data contained in the moving picture file linked to, for example, a simplified homepage, can be played back.

In this case, as in e-mail, the received data linked to, for example, a simplified homepage, may be recorded in the memory stick 523 via the recording/playback portion 563 according to the operation of the user.

Additionally, in the cellular telephone MS3, various application programs similar to those in the above-described embodiment are stored in the ROM of the main controller 550. Based on these application programs, the cellular telephone MS3 is able to access the live casting server 150 of the server-use reservation management center 5 (FIG. 11) so as to perform the above-described membership registration, live reservation registration, the real-time distribution processing, etc., with the live casting server 150.

Figure 29:
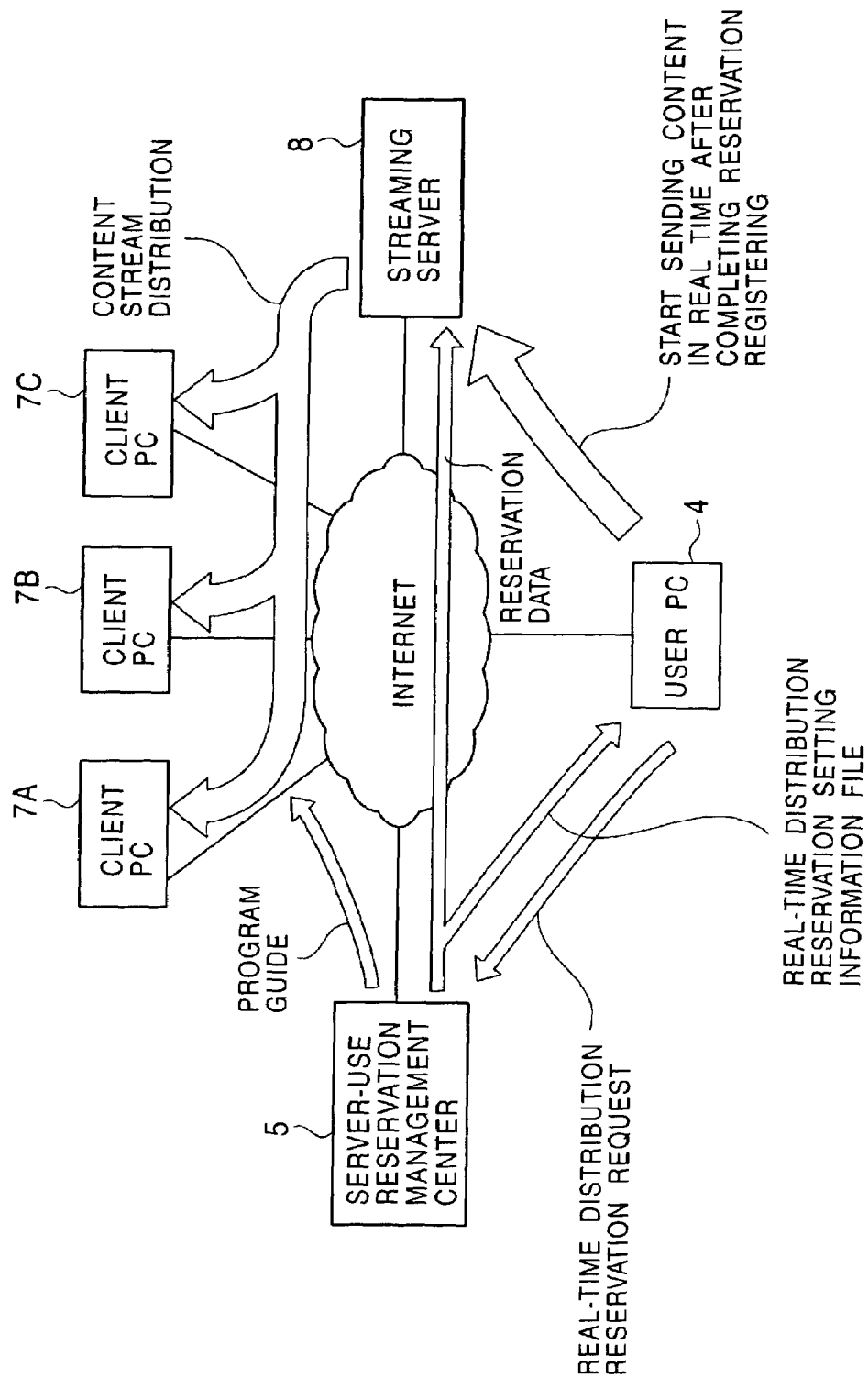
FIG. 29 is a schematic diagram illustrating the flow of real-time distribution reservation registering processing.
Figure 30:
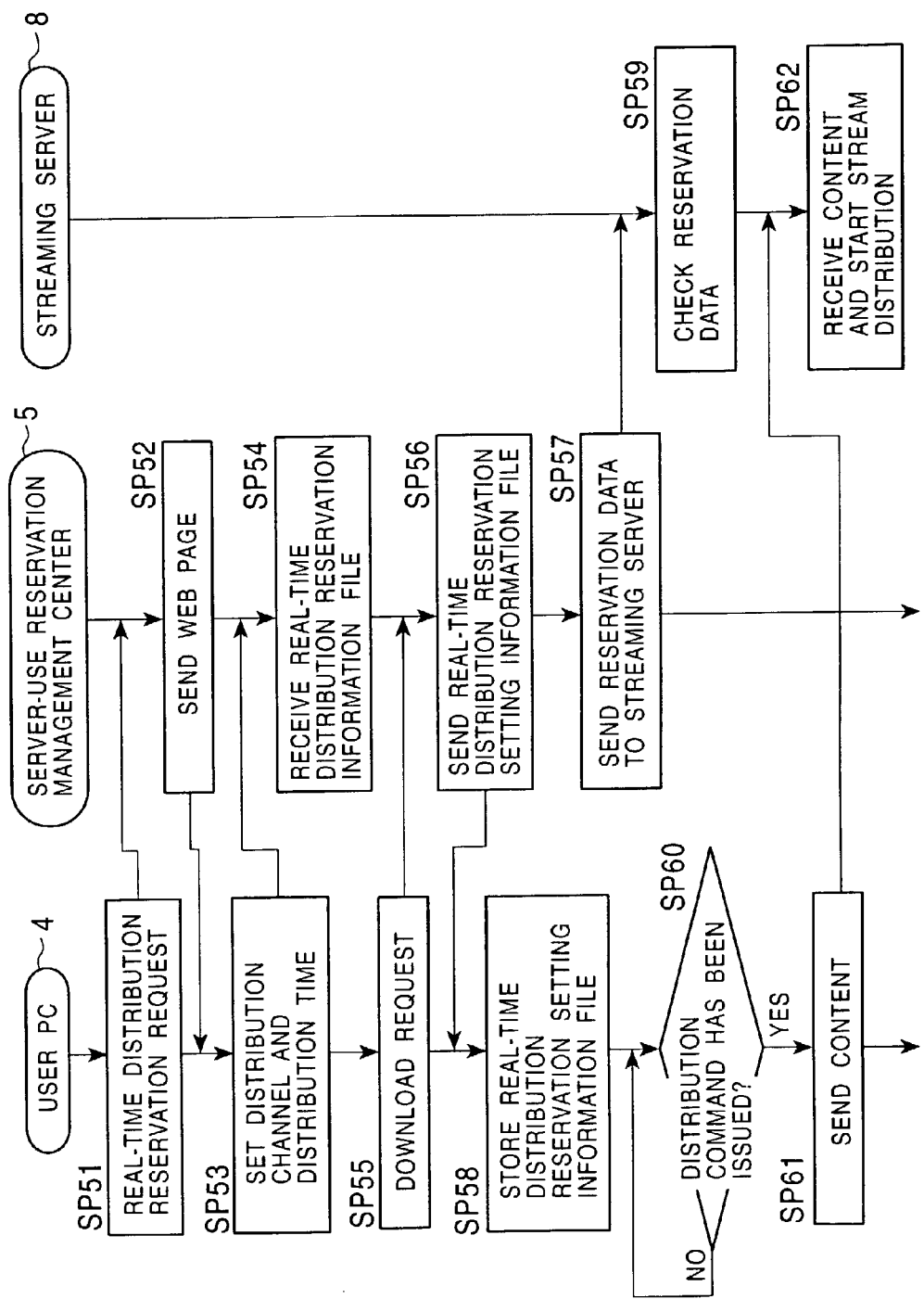
FIG. 30 is a flowchart illustrating the real-time distribution reservation registering sequence.

Thus, as in the user PC 4, by performing the real-time distribution reservation registering sequence shown in FIGS. 29 and 30, the cellular telephone MS3 is able to perform the real-time content distribution reservation with the live casting server 150, and distributes the content sent from the user PC 4 in real time via the streaming server 8.

In the foregoing embodiment, the personal content is distributed from the user PC 4 via the streaming server 8 as a personal broadcast. However, the present invention is not restricted to personal broadcasting, and the content may be distributed as a commercial Internet broadcast.

In the aforementioned embodiment, the server-use reservation management center 5, which serves as the content reservation management apparatus, is formed of the network interface 154, which serves as real-time distribution reservation receiving means for receiving a real-time distribution reservation request sent from the user PC 4, and the live casting server 150, which serves as control means for allowing the user PC 4 to reserve a predetermined time duration including the current time via an available channel, for sending the real-time distribution reservation setting information file to the user PC 4, and for immediately distributing the content sent from the user PC 4 based on the real-time distribution reservation setting information file to client PCs via the streaming server 8 by sending the reservation data to the streaming server 8. However, the content reservation management apparatus may be formed of other types of real-time distribution reservation receiving means and control means.

What is claimed is:

1. A content distribution system comprising:
   a user terminal;
   a content distribution server configured to distribute video content received from said user terminal via a first network to a client via a second network;
   a content reservation management apparatus configured to transmit a menu to the user terminal via the second network, the menu configured to display service times and unoccupied available channels to distribute content from the content distribution server and a service fee, availability and cost corresponding to each of the available service times and unoccupied available channels; and
   the content reservation management apparatus configured to receive a reservation via said second network for a distribution channel and a time slot in which the distribution channel is to be used from said user terminal,
   wherein said content reservation management apparatus receives a real time distribution reservation request via said second network from said user terminal in order to immediately distribute the content,
   in response to the real-time distribution reservation request, said content reservation management apparatus reserves a current time at which the request is received, in a requested distribution channel which is unoccupied at the current time, and sends reservation setting information concerning the reservation to said user terminal and to said content distribution server; and
   said content distribution server immediately distributes at the current time the content received from said user terminal via said first network according to the reservation setting information.

2. A content distribution system according to claim 1, wherein said content reservation management apparatus makes the reservation in minimum units of time, and performs billing processing in the minimum units of time even for a time period, including the current time, which is smaller than the minimum units of time.

3. A content reservation management apparatus for receiving a reservation for a distribution channel and a time slot in which the distribution channel is to be used from a user terminal when content received from the user terminal is distributed from a content distribution server to a client via a network, and for managing the received reservation, said content reservation management apparatus comprising:
   an interface configured to transmit a menu to the user terminal via the first network, the menu configured to display service times and unoccupied available channels to distribute content from the content distribution server and a service fee, availability and cost corresponding to each of the available service times and unoccupied available channels;
   real-time distribution reservation receiving means for receiving a real-time distribution reservation request from the user terminal via a first network in order to immediately distribute the content; and
   control means, for reserving, in response to the real-time distribution reservation request from said user terminal a current time at which the request is received, in a requested distribution channel which is unoccupied at the current time, and sending reservation setting information concerning the reservation to the user terminal and to the content distribution server, thereby achieving real-time distribution at the current time for immediately distributing the content received from the user terminal via a second network to the client via said first network in real time via the content distribution server based on the reservation setting information.

4. A content reservation management apparatus according to claim 3, wherein said control means makes the reservation in minimum units of time, and performs billing processing in the minimum units of time even for a time period including the current time, which is smaller than the minimum units of time.

5. A content reservation management method for receiving a reservation for a distribution channel and a time slot in which the distribution channel is to be used from a user terminal when video content received from the user terminal is distributed from a content distribution server to a client via a network, and for managing the received reservation, said content reservation management method comprising:
   transmitting a menu to the user terminal, the menu configured to display service times and unoccupied available channels to distribute content from the content distribution server and a service fee, availability and cost corresponding to each of the available service times and unoccupied available channels;
   receiving a real-time distribution reservation request from the user terminal via a first network in order to immediately distribute the video content; and
   reserving, in response to the real-time distribution reservation request from said user terminal, a current time at which the request is received, in a requested distribution channel which is unoccupied at the current time, and sending reservation setting information concerning the reservation to the user terminal and to the content distribution server, thereby achieving real-time distribution at the current time for immediately distributing the content received from the user terminal via a second network to the client via said first network in real time via the content distribution server based on the reservation setting information.

6. A content reservation management method according to claim 5, wherein said control step makes the reservation in minimum units of time, and performs billing processing in the minimum units of time even for a time period including the current time, which is smaller than the minimum units of time.

7. A computer-readable medium including a content reservation management program for allowing a computer to execute:
   transmitting a menu to a user terminal, the menu configured to display service times and unoccupied available channels to distribute content from a content distribution server and a service fee, availability and cost corresponding to each of the available service times and unoccupied available channels;
   receiving a real-time distribution reservation request from the user terminal via a first network in order to immediately distribute video content, when a reservation for a distribution channel and a time slot in which the distribution channel to be used is received from the user terminal,
   distributing the content received from the user terminal via a second network from the content distribution server to a client via said first network, according to the reservation request; and
   reserving, in response to the real-time distribution reservation request from said user terminal, a current time at which the request is received, in a requested distribution channel which is unoccupied at the current time, and sending reservation setting information concerning the reservation to the user terminal and to the content distribution server, thereby achieving real-time distribution at the current time for immediately distributing the content received from the user terminal via said second network to the client via said first network in real time via the content distribution server based on the reservation setting information.

8. A computer-readable medium according to claim 7, further comprising:

making the reservation in minimum units of time; and performing billing processing in the minimum units of time even for a time period including the current time, which is smaller than the minimum units of time.

9. A content distribution system according to claim 1, wherein said content reservation management apparatus includes a reservation data base in which at least the time slot and the distribution channel corresponded with each other, and the content reservation management apparatus is configured to refer to the reservation data base to determine an unoccupied distribution channel at the current time.

10. A content reservation management apparatus according to claim 3, wherein said control means includes a reservation data base in which at least the time slot and the distribution channel corresponded with each other, and the control means includes means for referring to the reservation data base to determine an unoccupied distribution channel at the current time.

11. A content reservation management method according to claim 5, wherein said reserving a current time comprises:

referring to a reservation data base including at least the time slot and the distribution channel corresponding with each other in order to determine an unoccupied distribution channel at the current time.

12. A content reservation management program according to claim 7, wherein said reserving a current time comprises:

referring to a reservation data base including at least the time slot and the distribution channel corresponding with each other in order to determine an unoccupied distribution channel at the current time.

13. The content distribution system of claim 1, wherein the first network is a dedicated network and the second network is an Internet connection.

14. The content reservation management apparatus of claim 3, wherein the first network is an Internet connection and the second network is a dedicated network.

15. The content reservation method of claim 5, wherein the first network is an Internet connection and the second network is a dedicated network.

16. The computer-readable medium of claim 7, wherein the first network is an Internet connection and the second network is a dedicated network.

* * * * *